(12) United States Patent
Yang et al.

(10) Patent No.: US 12,555,388 B2
(45) Date of Patent: Feb. 17, 2026

(54) DETERMINATION OF OBJECT TRAJECTORY FROM AUGMENTED IMAGE DATA

(71) Applicant: TORC Robotics, Inc., Blacksburg, VA (US)

(72) Inventors: Tianyi Yang, Blacksburg, VA (US); Dalong Li, Blacksburg, VA (US); Alex Smith, Blacksburg, VA (US)

(73) Assignee: TORC ROBOTICS, INC., Blacksburg, VA (US)

(*) Notice: Subject to any disclaimer, the term of this patent is extended or adjusted under 35 U.S.C. 154(b) by 349 days.

(21) Appl. No.: 18/309,663

(22) Filed: Apr. 28, 2023

(65) Prior Publication Data

US 2024/0362922 A1    Oct. 31, 2024

(51) Int. Cl.
*G06V 20/58* (2022.01)
*G06T 7/20* (2017.01)
*G06V 10/764* (2022.01)
*G06V 20/56* (2022.01)

(52) U.S. Cl.
CPC ............... *G06V 20/58* (2022.01); *G06T 7/20* (2013.01); *G06V 10/764* (2022.01); *G06V 20/588* (2022.01); *G06T 2207/30241* (2013.01); *G06V 2201/07* (2022.01)

(58) Field of Classification Search
CPC ...... G06V 20/58; G06V 20/588; G06V 20/56; G06V 10/764; G06V 10/62; G06V 10/82; G06V 2201/07; G06T 7/20; G06T 7/246; G06T 2207/30241; G06T 2207/20081; G06T 2207/20084
See application file for complete search history.

(56) References Cited

U.S. PATENT DOCUMENTS

| | | | |
|---|---|---|---|
| 2019/0096086 A1* | 3/2019 | Xu | G06T 7/60 |
| 2022/0080999 A1* | 3/2022 | Vora | G06N 3/045 |
| 2022/0366175 A1* | 11/2022 | Yu | G05D 1/2435 |

(Continued)

OTHER PUBLICATIONS

Kesa et al, Joint Learning Architecture for Multiple Object Tracking and Trajectory Forecasting, 2021, arXiv: 2108.10543v1, pp. 1-10. (Year: 2021).*

(Continued)

*Primary Examiner* — Kathleen M Broughton
(74) *Attorney, Agent, or Firm* — Armstrong Teasdale LLP

(57) ABSTRACT

Aspects of this technical solution can include identifying, by a processor coupled to non-transitory memory, a plurality of bounding boxes for one or more objects depicted in each image of a sequence of images captured during operation of an autonomous vehicle, allocating, by the processor and based on corresponding positions of the bounding boxes in each image and corresponding time stamps, one or more of the bounding boxes to one or more tracking identifiers each indicating trajectories of corresponding objects, generating, by the processor and based on the time stamps and the bounding boxes allocated to each of the tracking identifiers, one or more tracking images for each of the tracking identifiers, each of the tracking images including visual indications of the time stamps, and training, by the processor and based on the tracking images, an artificial intelligence model to output an indication of a type of trajectory.

20 Claims, 11 Drawing Sheets

(56) References Cited

U.S. PATENT DOCUMENTS

2023/0286530 A1* 9/2023 Angerer ............. G01C 21/3807
2024/0282080 A1* 8/2024 Yang ................... G06V 10/764

OTHER PUBLICATIONS

Azimjonov et al, Vision-based vehicle tracking on highway traffic using bounding-box features to extract statistical information, 2022, Computers and Electrical Engineering, 97 (2022) pp. 1-13. (Year: 2022).*

Cruciata et al, Iterative Multiple Bounding-Box Refinements for Visual Tracking, 2022, J. of Imaging, 8(61): 1-16. (Year: 2022).*

Chen et al., "A Simple Framework for Contrastive Learning of Visual Representations", Proceedings of the 37th International Conference on Machine Learning (2020), pp. 1-20.

"TNO: Innovation for Life", Retrieved from Internet: https://www.tno.nl/nl/over-tno/.

Gansbeke et al., "SCAN: Learning to Classify Images without Labels", European Conference on Computer Vision (2020), pp. 1-26.

"Semantic Image Clustering", Khalid Salama, Feb. 28, 2021, Retrieved from Internet: https://keras.io/examples/vision/semantic_image_clustering/#semantic-clustering-with-nearest-neighbours.

* cited by examiner

1100

```
┌─────────────────────────────────────────────────────────────────┐
│  Generate One Or More Tracking Images For Each Of        1110   │
│  Tracking Identifiers                                           │
│  ┌───────────────────────────────────────────────────────────┐  │
│  │ Generate Each Of Tracking Images Including One      1112  │  │
│  │ Or More Visual Indications Of Time Stamps                 │  │
│  └───────────────────────────────────────────────────────────┘  │
│                                                                 │
│  ┌───────────────────────────────────────────────────────────┐  │
│  │ Generate Based On Time Stamps And Bounding Boxes    1114  │  │
│  │ Allocated To Each Of Tracking Identifiers                 │  │
│  └───────────────────────────────────────────────────────────┘  │
│                                                                 │
│  ┌───────────────────────────────────────────────────────────┐  │
│  │ Generate By One Or More Processors                  1116  │  │
│  └───────────────────────────────────────────────────────────┘  │
└─────────────────────────────────────────────────────────────────┘
                                │
┌─────────────────────────────────────────────────────────────────┐
│  Train Artificial Intelligence Model To Output           1120   │
│  Indication Of Type Of Trajectory                               │
│  ┌───────────────────────────────────────────────────────────┐  │
│  │ Train Based On Input Including Tracking Images      1122  │  │
│  │ Having Visual Indications                                 │  │
│  └───────────────────────────────────────────────────────────┘  │
│                                                                 │
│  ┌───────────────────────────────────────────────────────────┐  │
│  │ Train By One Or More Processors                     1124  │  │
│  └───────────────────────────────────────────────────────────┘  │
└─────────────────────────────────────────────────────────────────┘
```

Fig. 11

DETERMINATION OF OBJECT TRAJECTORY FROM AUGMENTED IMAGE DATA

TECHNICAL FIELD

The present implementations relate generally to artificial intelligence models to determine object trajectory from image data of an object detected by an autonomous vehicle.

INTRODUCTION

Due to the real-time nature of vehicle navigation, accurate detection of the physical environment is paramount for safely operating autonomous vehicles on public roadways. However, conventional approaches for processing sensor data can fail to effectively detect the physical environment, particularly, physical obstacles that appear in images with occlusion, low resolution, and at unusual angles.

SUMMARY

This technical solution is directed at least to analysis of image data using artificial intelligence models, specifically to determine a type of trajectory associated with an object. Thus, a technical solution for artificial intelligence to determine trajectory type from image data is provided.

At least one aspect is directed to a method. The method can include identifying, by one or more processors coupled to non-transitory memory, a plurality of bounding boxes for one or more objects depicted in each image of a sequence of images captured during operation of an autonomous vehicle. The method can include allocating, by the one or more processors and based on corresponding positions of the bounding boxes in each image and corresponding time stamps of the bounding boxes in the sequence, one or more of the bounding boxes to one or more tracking identifiers each indicating trajectories of corresponding objects. The method can include generating, by the one or more processors and based on the time stamps and the bounding boxes allocated to each of the tracking identifiers, one or more tracking images for each of the tracking identifiers, each of the tracking images can include one or more visual indications of the time stamps. The method can include training, by the one or more processors and based on input that can include the tracking images having the visual indications, an artificial intelligence model to output an indication of a type of trajectory associated with the tracking identifier.

At least one aspect is directed to a system. The system can include one or more processors coupled to non-transitory memory, the one or more processors configured to identify a plurality of bounding boxes for one or more objects depicted in each image of a sequence of images captured during operation of an autonomous vehicle. The system can allocate, based on corresponding positions of the bounding boxes in each image and corresponding time stamps of the bounding boxes in the sequence, one or more of the bounding boxes to one or more tracking identifiers each indicating trajectories of corresponding objects. The system can generate, based on the time stamps and the bounding boxes allocated to each of the tracking identifiers, one or more tracking images for each of the tracking identifiers, each of the tracking images can include one or more visual indications of the time stamps. The system can train, based on input that can include the tracking images having the visual indications, an artificial intelligence model to output an indication of a type of trajectory.

At least one aspect is directed to a non-transitory computer readable medium can include one or more instructions stored thereon and executable by a processor. The processor can identify a plurality of bounding boxes for one or more objects depicted in each image of a sequence of images captured during operation of an autonomous vehicle. The processor can allocate, based on corresponding positions of the bounding boxes in each image and corresponding time stamps of the bounding boxes in the sequence, one or more of the bounding boxes to one or more tracking identifiers each indicating trajectories of corresponding ones of the objects. The processor can generate, based on the time stamps and the bounding boxes allocated to each of the tracking identifiers, one or more tracking images for each of the tracking identifiers, each of the tracking images can include one or more visual indications of the time stamps. The processor can train, based on input that can include the tracking images having the visual indications, an artificial intelligence model to output an indication of a type of trajectory.

BRIEF DESCRIPTION OF THE FIGURES

These and other aspects and features of the present implementations are depicted by way of example in the figures discussed herein. Present implementations can be directed to, but are not limited to, examples depicted in the figures discussed herein.

FIG. 11 depicts an example method of using artificial intelligence to determine trajectory type from image data, in accordance with present implementations.

DETAILED DESCRIPTION

Aspects of this technical solution are described herein with reference to the figures, which are illustrative examples of this technical solution. The figures and examples below are not meant to limit the scope of this technical solution to the present implementations or to a single implementation, and other implementations in accordance with present implementations are possible, for example, by way of interchange of some or all of the described or illustrated elements. Where certain elements of the present implementations can be partially or fully implemented using known components, only those portions of such known components that are necessary for an understanding of the present implementations are described, and detailed descriptions of other portions of such known components are omitted to not obscure the present implementations. Terms in the specification and claims are to be ascribed no uncommon or special meaning unless explicitly set forth herein. Further, this technical solution and the present implementations encompass present and future known equivalents to the known components referred to herein by way of description, illustration, or example.

Figure 1:
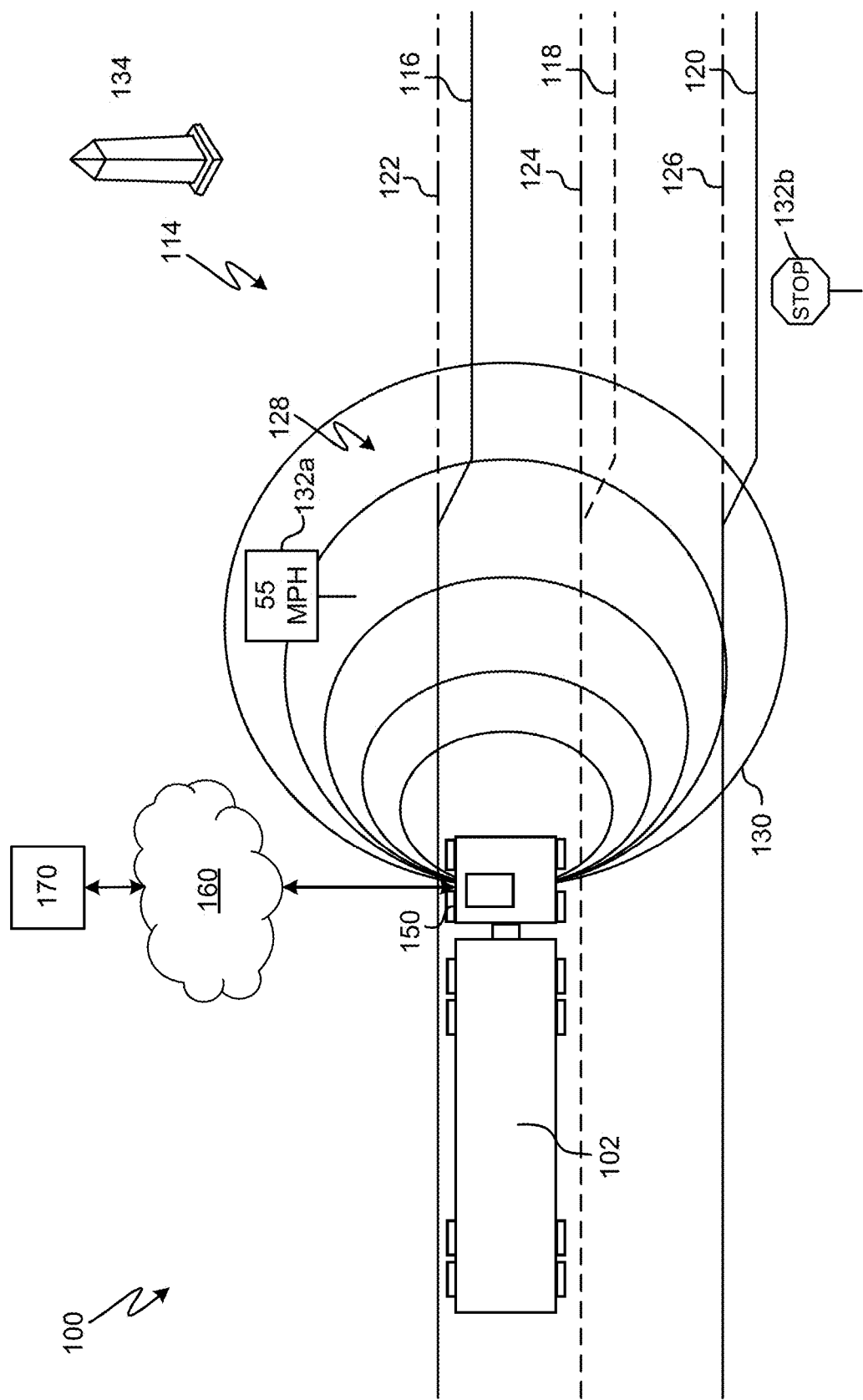
FIG. 1 is a bird's eye view of a roadway including a schematic representation of a vehicle and aspects of an autonomy system of the vehicle, according to an embodiment.

Referring to FIG. 1, the present disclosure relates to autonomous vehicles, such as an autonomous truck 102 having an autonomy system 150. The autonomy system 150 of truck 102 may be completely autonomous (fully-autonomous), such as self-driving, driverless, or Level 4 autonomy, or semi-autonomous, such as Level 3 autonomy. As used herein the term "autonomous" includes both fully-autonomous and semi-autonomous. The present disclosure sometimes refers to autonomous vehicles as ego vehicles. The autonomy system 150 may be structured on at least three aspects of technology: (1) perception, (2) maps/localization, and (3) behaviors planning and control. The function of the perception aspect is to sense an environment surrounding truck 102 and interpret it. To interpret the surrounding environment, a perception module or engine in the autonomy system 150 of the truck 102 may identify and classify objects or groups of objects in the environment. For example, a perception module associated with various sensors (e.g., LiDAR, camera, radar, etc.) of the autonomy system 150 may identify one or more objects (e.g., pedestrians, vehicles, debris, etc.) and features of the roadway (e.g., lane lines) around truck 102, and classify the objects in the road distinctly.

The maps/localization aspect of the autonomy system 150 may be configured to determine where on a pre-established digital map the truck 102 is currently located. One way to do this is to sense the environment surrounding the truck 102 (e.g., via the perception system) and to correlate features of the sensed environment with details (e.g., digital representations of the features of the sensed environment) on the digital map.

Once the systems on the truck 102 have determined its location with respect to the digital map features (e.g., location on the roadway, upcoming intersections, road signs, etc.), the truck 102 can plan and execute maneuvers and/or routes with respect to the features of the digital map. The behaviors, planning, and control aspects of the autonomy system 150 may be configured to make decisions about how the truck 102 should move through the environment to get to its goal or destination. It may consume information from the perception and maps/localization modules to know where it is relative to the surrounding environment and what other objects and traffic actors are doing.

FIG. 1 further illustrates an environment 100 for modifying one or more actions of truck 102 using the autonomy system 150. The truck 102 is capable of communicatively coupling to a remote server 170 via a network 160. The truck 102 may not necessarily connect with the network 160 or server 170 while it is in operation (e.g., driving down the roadway). That is, the server 170 may be remote from the vehicle, and the truck 102 may deploy with all the necessary perception, localization, and vehicle control software and data necessary to complete its mission fully-autonomously or semi-autonomously.

While this disclosure refers to a truck (e.g., a tractor trailer) 102 as the autonomous vehicle, it is understood that the truck 102 could be any type of vehicle including an automobile, a mobile industrial machine, etc. While the disclosure will discuss a self-driving or driverless autonomous system, it is understood that the autonomous system could alternatively be semi-autonomous having varying degrees of autonomy or autonomous functionality.

Figure 2:
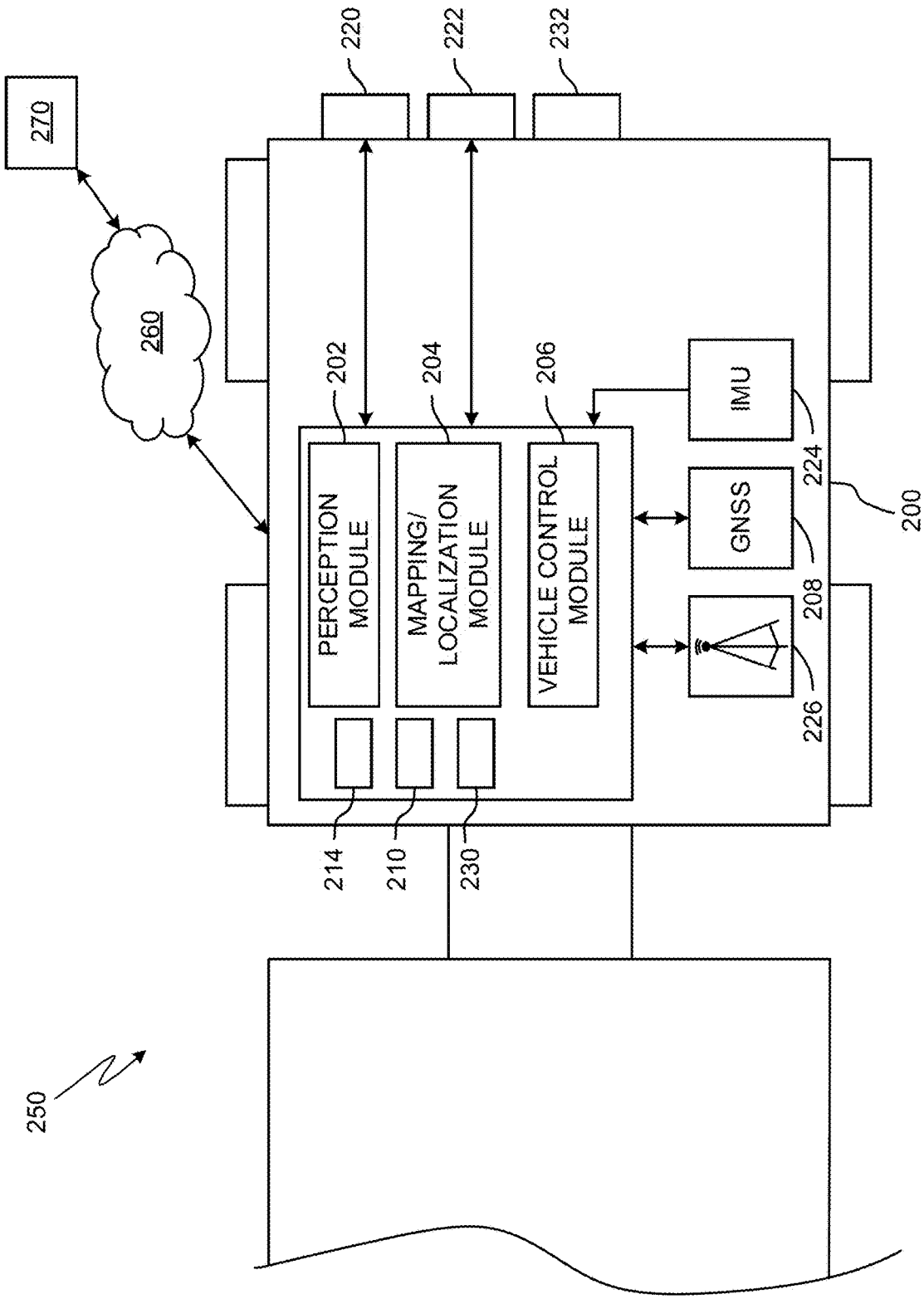
FIG. 2 is a schematic of the autonomy system of the vehicle, according to an embodiment.

With reference to FIG. 2, an autonomy system 250 may include a perception system including a camera system 220, a LiDAR system 222, a radar system 232, a GNSS receiver 208, an inertial measurement unit (IMU) 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include more, fewer, or different components or systems, and each of the components or system(s) may include more, fewer, or different components. Additionally, the systems and components shown may be combined or divided in various ways. As show in FIG. 1, the perception systems aboard the autonomous vehicle may help the truck 102 perceive its environment out to a perception radius 130. The actions of the truck 102 may depend on the extent of perception radius 130.

The camera system 220 of the perception system may include one or more cameras mounted at any location on the truck 102, which may be configured to capture images of the environment surrounding the truck 102 in any aspect or field of view (FOV). The FOV can have any angle or aspect such that images of the areas ahead of, to the side, and behind the truck 102 may be captured. In some embodiments, the FOV may be limited to particular areas around the truck 102 (e.g., forward of the truck 102) or may surround 360 degrees of the truck 102. In some embodiments, the image data generated by the camera system(s) 220 may be sent to the perception module 202 and stored, for example, in memory 214. In some embodiments, the image data generated by the camera system(s) 220, as well as any classification data or object detection data (e.g., bounding boxes, estimated distance information, velocity information, mass information, etc.) generated by the object tracking and classification module 230, can be transmitted to the remote server 270 for additional processing (e.g., correction of detected misclassifications from the image data, training of artificial intelligence models, etc.).

The LiDAR system 222 may include a laser generator and a detector and can send and receive a LiDAR signals. The LiDAR signal can be emitted to and received from any direction such that LiDAR point clouds (or "LiDAR images") of the areas ahead of, to the side, and behind the truck 200 can be captured and stored as LiDAR point clouds. In some embodiments, the truck 200 may include multiple LiDAR systems and point cloud data from the multiple systems may be stitched together. In some embodiments, the system inputs from the camera system 220 and the LiDAR system 222 may be fused (e.g., in the perception module 202). The LiDAR system 222 may include one or more actuators to modify a position and/or orientation of the LiDAR system 222 or components thereof. The LIDAR system 222 may be configured to use ultraviolet (UV), visible, or infrared light to image objects and can be used with a wide range of targets. In some embodiments, the LiDAR system 222 can be used to map physical features of an object with high resolution (e.g., using a narrow laser beam). In some examples, the LiDAR system 222 may generate a point cloud and the point cloud may be rendered to visualize the environment surrounding the truck 200 (or object(s) therein). In some embodiments, the point cloud may be rendered as one or more polygon(s) or mesh model(s) through, for example, surface reconstruction. Collectively, the LiDAR system 222 and the camera system 220 may be referred to herein as "imaging systems."

The radar system 232 may estimate strength or effective mass of an object, as objects made out of paper or plastic may be weakly detected. The radar system 232 may be based on 24 GHZ, 77 GHZ, or other frequency radio waves. The radar system 232 may include short-range radar (SRR), mid-range radar (MRR), or long-range radar (LRR). One or more sensors may emit radio waves, and a processor processes received reflected data (e.g., raw radar sensor data).

The GNSS receiver 208 may be positioned on the truck 200 and may be configured to determine a location of the truck 200 via GNSS data, as described herein. The GNSS receiver 208 may be configured to receive one or more signals from a global navigation satellite system (GNSS) (e.g., GPS system) to localize the truck 200 via geolocation. The GNSS receiver 208 may provide an input to and otherwise communicate with mapping/localization module 204 to, for example, provide location data for use with one or more digital maps, such as an HD map (e.g., in a vector layer, in a raster layer or other semantic map, etc.). In some embodiments, the GNSS receiver 208 may be configured to receive updates from an external network.

The IMU 224 may be an electronic device that measures and reports one or more features regarding the motion of the truck 200. For example, the IMU 224 may measure a velocity, acceleration, angular rate, and or an orientation of the truck 200 or one or more of its individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204, to help determine a real-time location of the truck 200, and predict a location of the truck 200 even when the GNSS receiver 208 cannot receive satellite signals.

The transceiver 226 may be configured to communicate with one or more external networks 260 via, for example, a wired or wireless connection in order to send and receive information (e.g., to a remote server 270). The wireless connection may be a wireless communication signal (e.g., Wi-Fi, cellular, LTE, 5g, etc.) In some embodiments, the transceiver 226 may be configured to communicate with external network(s) via a wired connection, such as, for example, during initial installation, testing, or service of the autonomy system 250 of the truck 200. A wired/wireless connection may be used to download and install various lines of code in the form of digital files (e.g., HD digital maps), executable programs (e.g., navigation programs), and other computer-readable code that may be used by the system 250 to navigate the truck 200 or otherwise operate the truck 200, either fully-autonomously or semi-autonomously. The digital files, executable programs, and other computer readable code may be stored locally or remotely and may be routinely updated (e.g., automatically or manually) via the transceiver 226 or updated on demand.

In some embodiments, the truck 200 may not be in constant communication with the network 260 and updates which would otherwise be sent from the network 260 to the truck 200 may be stored at the network 260 until such time as the network connection is restored. In some embodiments, the truck 200 may deploy with all of the data and software it needs to complete a mission (e.g., necessary perception, localization, and mission planning data) and may not utilize any connection to network 260 during some or the entire mission. Additionally, the truck 200 may send updates to the network 260 (e.g., regarding unknown or newly detected features in the environment as detected by perception systems) using the transceiver 226. For example, when the truck 200 detects differences in the perceived environment with the features on a digital map, the truck 200 may update the network 260 with information, as described in greater detail herein.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. Autonomy system 250 may include a single microprocessor or multiple microprocessors that may include means for identifying and reacting to differences between features in the perceived environment and features of the maps stored on the truck. Numerous commercially available microprocessors can be configured to perform the functions of the autonomy system 250. It should be appreciated that autonomy system 250 could include a general machine controller capable of controlling numerous other machine functions. Alternatively, a special-purpose machine controller could be provided. Further, the autonomy system 250, or portions thereof, may be located remote from the system 250. For example, one or more features of the mapping/localization module 204 could be located remote of truck. Various other known circuits may be associated with the autonomy system 250, including signal-conditioning circuitry, communication circuitry, actuation circuitry, and other appropriate circuitry.

Figure 5:
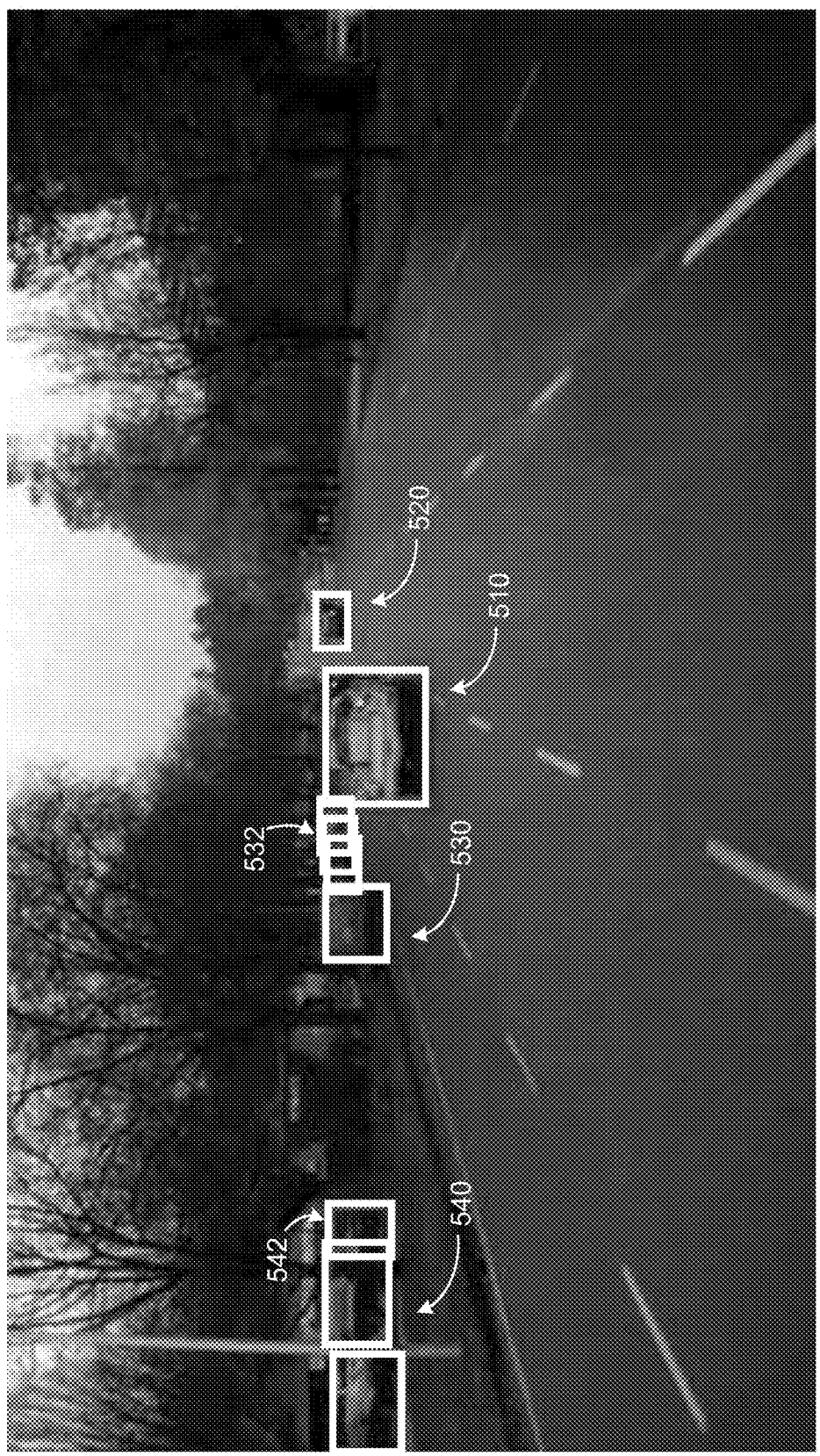
FIG. 5 depicts an example augmentation for a physical environment, in accordance with present implementations.
Figure 6:
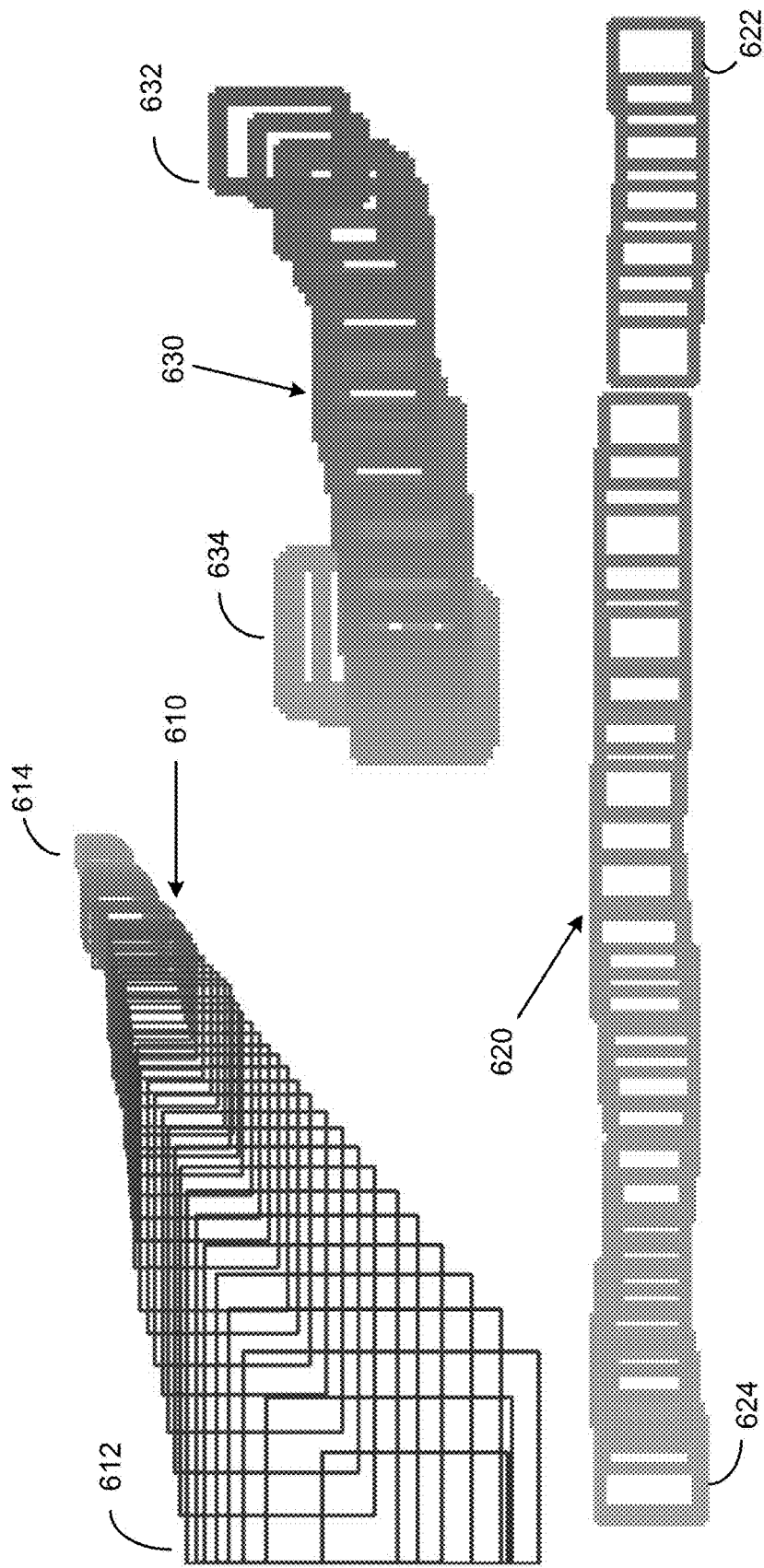
FIG. 6 depicts an example trajectory indicators, in accordance with present implementations.

The memory 214 of autonomy system 250 may store data and/or software routines that may assist the autonomy system 250 in performing its functions, such as the functions of the perception module 202, the mapping/localization module 204, the vehicle control module 206, an object tracking and classification module 230, the method 500 described herein with respect to FIG. 5, and the method 600 described herein with respect to FIG. 6. Further, the memory 214 may also store data received from various inputs associated with the autonomy system 250, such as perception data from the perception system. For example, the memory 214 may store image data generated by the camera system(s) 220, as well as any classification data or object detection data (e.g., bounding boxes, estimated distance information, velocity information, mass information, etc.) generated by the object tracking and classification module 230.

As noted above, perception module 202 may receive input from the various sensors, such as camera system 220, LiDAR system 222, GNSS receiver 208, and/or IMU 224 (collectively "perception data") to sense an environment surrounding the truck and interpret it. To interpret the surrounding environment, the perception module 202 (or "perception engine") may identify and classify objects or groups of objects in the environment. For example, the truck 102 may use the perception module 202 to identify one or more objects (e.g., pedestrians, vehicles, debris, etc.) or features of the roadway 114 (e.g., intersections, road signs, lane lines, etc.) before or beside a vehicle and classify the objects in the road. In some embodiments, the perception module 202 may include an image classification function and/or a computer vision function. In some implementations, the perception module 202 may include, communicate with, or otherwise utilize the object tracking and classification module 230 to perform object detection and classification operations.

The system 100 may collect perception data. The perception data may represent the perceived environment surrounding the vehicle, for example, and may be collected using aspects of the perception system described herein. The perception data can come from, for example, one or more of the LiDAR system, the camera system, and various other externally-facing sensors and systems on board the vehicle (e.g., the GNSS receiver, etc.). For example, on vehicles having a sonar or radar system, the sonar and/or radar systems may collect perception data. As the truck 102 travels along the roadway 114, the system 100 may continually receive data from the various systems on the truck 102. In some embodiments, the system 100 may receive data periodically and/or continuously.

With respect to FIG. 1, the truck 102 may collect perception data that indicates presence of the lane lines 116, 118, 120. Features perceived by the vehicle should generally track with one or more features stored in a digital map (e.g., in the mapping/localization module 204). Indeed, with respect to FIG. 1, the lane lines that are detected before the truck 102 is capable of detecting the bend 128 in the road (that is, the lane lines that are detected and correlated with a known, mapped feature) will generally match with features in stored map and the vehicle will continue to operate in a normal fashion (e.g., driving forward in the left lane of the roadway or per other local road rules). However, in the depicted scenario the vehicle approaches a new bend 128 in the road that is not stored in any of the digital maps onboard the truck 102 because the lane lines 116, 118, 120 have shifted right from their original positions 122, 124, 126.

The system 100 may compare the collected perception data with stored data. For example, the system may identify and classify various features detected in the collected perception data from the environment with the features stored in a digital map. For example, the detection systems may detect the lane lines 116, 118, 120 and may compare the detected lane lines with lane lines stored in a digital map. Additionally, the detection systems could detect the road signs 132a, 132b and the landmark 134 to compare such features with features in a digital map. The features may be stored as points (e.g., signs, small landmarks, etc.), lines (e.g., lane lines, road edges, etc.), or polygons (e.g., lakes, large landmarks, etc.) and may have various properties (e.g., style, visible range, refresh rate, etc.), which properties may control how the system 100 interacts with the various features. Based on the comparison of the detected features with the features stored in the digital map(s), the system may generate a confidence level, which may represent a confidence of the vehicle in its location with respect to the features on a digital map and hence, its actual location.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module (e.g., the object detection and classification module 230) that may be communicatively coupled to a repository of images or image data (e.g., visual data and/or point cloud data) which may be used to detect and classify objects and/or features in real time image data captured by, for example, the camera system 220 and the LiDAR system 222. In some embodiments, the image classification function may be configured to detect and classify features based on information received from only a portion of the multiple available sources. For example, in the case that the captured visual camera data includes images that may be blurred, the system 250 may identify objects based on data from one or more of the other systems (e.g., LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the truck 200 (e.g., lane lines). The computer vision function may use, for example, an object recognition algorithm, video tracing, one or more photogrammetric range imaging techniques (e.g., a structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size, etc.). The computer vision function may be embodied by a software module (e.g., the object detection and classification module 230) that may be communicatively coupled to a repository of images or image data (e.g., visual data and/or point cloud data), and may additionally implement the functionality of the image classification function.

Mapping/localization module 204 receives perception data that can be compared to one or more digital maps stored in the mapping/localization module 204 to determine where the truck 200 is in the world and/or or where the truck 200 is on the digital map(s). In particular, the mapping/localization module 204 may receive perception data from the perception module 202 and/or from the various sensors sensing the environment surrounding the truck 200, and may correlate features of the sensed environment with details (e.g., digital representations of the features of the sensed environment) on the one or more digital maps. The digital map may have various levels of detail and can be, for example, a raster map, a vector map, etc. The digital maps may be stored locally on the truck 200 and/or stored and accessed remotely. In at least one embodiment, the truck 200 deploys with sufficiently stored information in one or more digital map files to complete a mission without connection to an external network during the mission. A centralized mapping system may be accessible via network 260 for updating the digital map(s) of the mapping/localization module 204. The digital map may be built through repeated observations of the operating environment using the truck 200 and/or trucks or other vehicles with similar functionality. For instance, the truck 200, a specialized mapping vehicle, a standard autonomous vehicle, or another vehicle, can run a route several times and collect the location of all targeted map features relative to the position of the vehicle conducting the map generation and correlation. These repeated observations can be averaged together in a known way to produce a highly accurate, high-fidelity digital map. This generated digital map can be provided to each vehicle (e.g., from the network 260 to the truck 200) before the vehicle departs on its mission so it can carry it onboard and use it within its mapping/localization module 204. Hence, the truck 200 and other vehicles (e.g., a fleet of trucks similar to the truck 200) can generate, maintain (e.g., update), and use their own generated maps when conducting a mission.

The generated digital map may include an assigned confidence score assigned to all or some of the individual digital feature representing a feature in the real world. The confidence score may be meant to express the level of confidence that the position of the element reflects the real-time position of that element in the current physical environment. Upon map creation, after appropriate verification of the map (e.g., running a similar route multiple times such that a given feature is detected, classified, and localized multiple times), the confidence score of each element will be very high, possibly the highest possible score within permissible bounds.

The vehicle control module 206 may control the behavior and maneuvers of the truck. For example, once the systems on the truck have determined its location with respect to map features (e.g., intersections, road signs, lane lines, etc.) the truck may use the vehicle control module 206 and its associated systems to plan and execute maneuvers and/or routes with respect to the features of the environment. The vehicle control module 206 may make decisions about how the truck will move through the environment to get to its goal or destination as it completes its mission. The vehicle control module 206 may consume information from the perception module 202 and the maps/localization module 204 to know where it is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems, for example, the vehicle control module 206 may control one or more of a vehicle steering system, a propulsion system, and/or a braking system. The propulsion system may be configured to provide powered motion for the truck and may include, for example, an engine/motor, an energy source, a transmission, and wheels/tires and may be coupled to and receive a signal from a throttle system, for example, which may be any combination of mechanisms configured to control the operating speed and acceleration of the engine/motor and thus, the speed/acceleration of the truck. The steering system may be any combination of mechanisms configured to adjust the heading or direction of the truck. The brake system may be, for example, any combination of mechanisms configured to decelerate the truck (e.g., friction braking system, regenerative braking system, etc.) The vehicle control module 206 may be configured to avoid obstacles in the environment surrounding the truck and may be configured to use one or more system inputs to identify, evaluate, and modify a vehicle trajectory. The vehicle control module 206 is depicted as a single module, but can be any combination of software agents and/or hardware modules able to generate vehicle control signals operative to monitor systems and control various vehicle actuators. The vehicle control module 206 may include a steering controller and for vehicle lateral motion control and a propulsion and braking controller for vehicle longitudinal motion.

Figure 3:
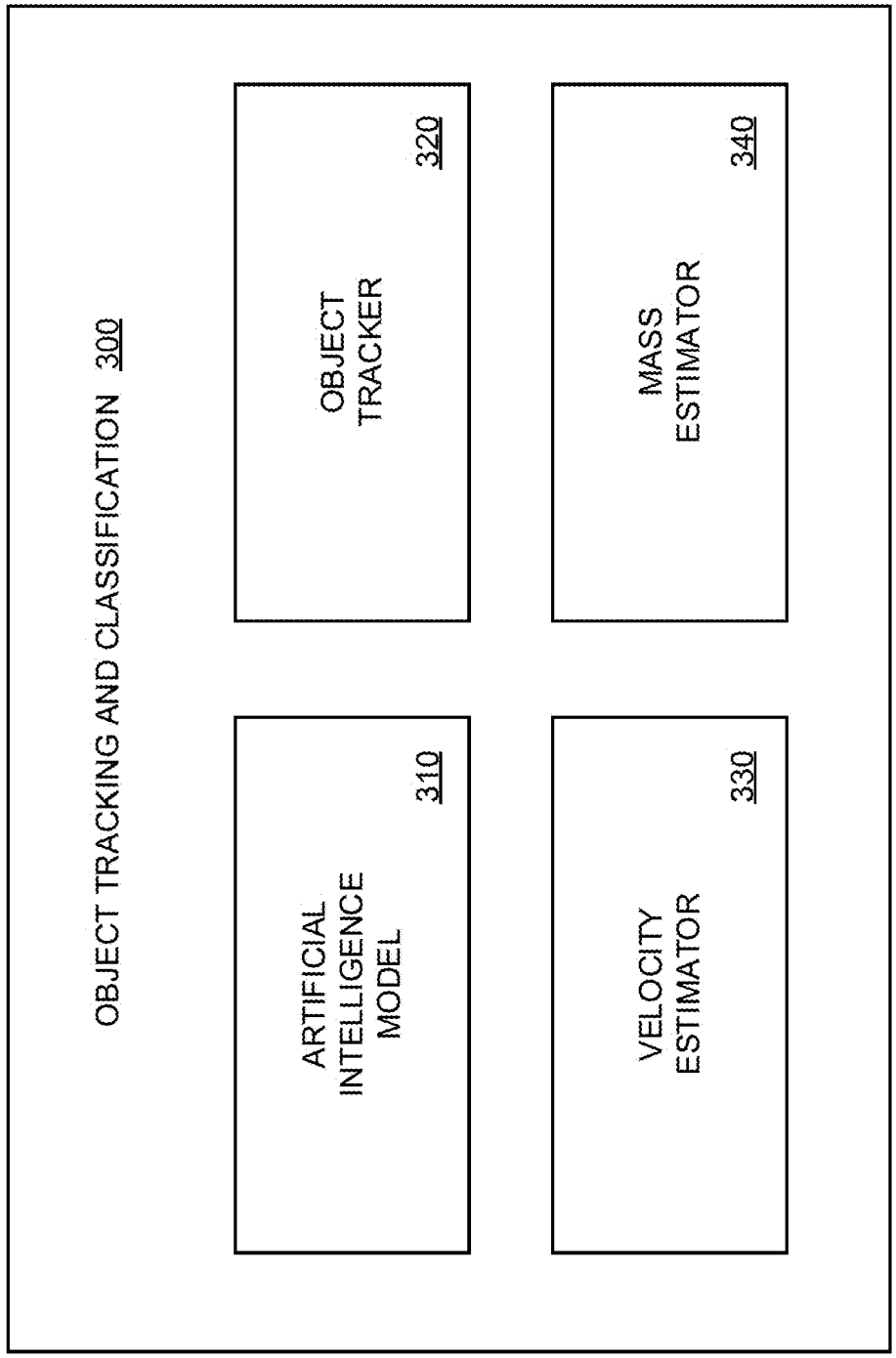
FIG. 3 is a schematic diagram of an object detection and tracking module of the autonomy system of the vehicle, according to an embodiment.

FIG. 3 shows an object tracking and classification module 300 of system 100, 250. Object tracking and classification module 300 includes artificial intelligence model 310, object tracker 320, velocity estimator 330, and effective mass estimator 340. These components of object detecting and tracking module 300 may be either or both software-based components and hardware-based components. In some embodiments, one or more components of the object tracking and classification module 300 may be stored and executed by a remote server (e.g., remote server 170 of FIG. 1, remote server 270 of FIG. 2, remote server 410a of FIG. 4, etc.).

In an embodiment, object tracking and classification module 230, 300 executes the artificial intelligence model 310 to detect and classify objects in sequences of images captured by at least one sensor (e.g., a camera, a video camera or video streaming device, etc.) of the autonomous vehicle. In some implementations, the artificial intelligence model 310 can be executed in response to receiving an image from at least one sensor of the autonomous vehicle. The artificial intelligence model 310 can be or may include one or more neural networks. The artificial intelligence model 310 can be a single shot multi-box detector, and can process an entire input image in one forward pass. Processing the entire input image in one forward pass improves processing efficiency, and enables the artificial intelligence model 310 to be utilized for real-time or near real-time autonomous driving tasks.

In some embodiments, the input to the artificial intelligence model 310 may be pre-processed, or the artificial intelligence model 310 itself may perform additional processing on the input data. For example, an input image to the artificial intelligence model 310 can be divided into a grid of cells of a configurable (e.g., based on the architecture of the artificial intelligence model 310) size. The artificial intelligence model 310 can generate a respective prediction (e.g., classification, object location, object size/bounding box, etc.) for each cell extracted from the input image. As such, each cell can correspond to a respective prediction, presence, and location of an object within its respective area of the input image. The artificial intelligence model 310 may also generate one or more respective confidence values indicating a level of confidence that the predictions are correct. If an object represented in the image spans multiple cells, the cell with the highest prediction confidence can be utilized to detect the object. The artificial intelligence model 310 can output bounding boxes and class probabilities for each cell, or may output a single bounding box and class probability determined based on the bounding boxes and class probabilities for each cell. In some embodiments, the class and bounding box predictions are processed by non-maximum suppression and thresholding to produce final output predictions.

The artificial intelligence model 310 may be or may include a deep convolutional neural network (CNN), which may include one or more layers that may implement machine-learning functionality. The one or more layers can include, in a non-limiting example, convolutional layers, max-pooling layers, activation layers and fully connected layers, among others. Convolutional layers can extract features from the input image (or input cell) using convolution operations. The convolutional layers can be followed, for example, by activation functions (e.g., a rectified linear activation unit (ReLU) activation function, exponential linear unit (ELU) activation function, etc.), model. The convolutional layers can be trained to process a hierarchical representation of the input image, where lower level features are combined to form higher-level features that may be utilized by subsequent layers in the artificial intelligence model 310.

The artificial intelligence model 310 may include one or more max-pooling layers, which may down-sample the feature maps produced by the convolutional layers, for example. The max-pooling operation can replace the maximum value of a set of pixels in a feature map with a single value. Max-pooling layers can reduce the dimensionality of data represented in the artificial intelligence model 310. The artificial intelligence model 310 may include multiple sets of convolutional layers followed by a max-pooling layer, with the max-pooling layer providing its output to the next set of convolutional layers in the artificial intelligence model. The artificial intelligence model 310 can include one or more fully connected layers, which may receive the output of one or more max-pooling layers, for example, and generate predictions as described herein. A fully connected layer may include multiple neurons, which perform a dot product between the input to the layer and a set of trainable weights, followed by an activation function. Each neuron each neuron in a fully connected layer can be connected to all neurons or all input data of the previous layer. The activation function can be, for example, a sigmoid activation function that produces class probabilities for each object class for which the artificial intelligence model is trained. The fully connected layers may also predict the bounding box coordinates for each object detected in the input image.

The artificial intelligence model 310 may include or may utilize one or more anchor boxes to improve the accuracy of its predictions. Anchor boxes can include predetermined boxes with different aspect ratios that are used as references for final object detection predictions. The artificial intelligence model 310 can utilize anchor boxes to ensure that the bounding boxes it outputs have the correct aspect ratios for the objects they are detecting. The predetermined anchor boxes may be pre-defined or selected based on prior knowledge of the aspect ratios of objects that the model will encounter in the images captured by the sensors of autonomous vehicles. The size and aspect ratios of anchor boxes can be can determined based on statistical analysis of the aspect ratios of objects in a training dataset, for example. The anchor boxes may remain fixed in size and aspect ratio during both training and inference, and may be chosen to be representative of the objects in the target dataset.

The artificial intelligence model 310 may be trained at one or more remote servers (e.g., the remote server 170, the remote server 270, the remote server 410a, etc.) using any suitable machine-learning training technique, including supervised learning, semi-supervised learning, self-supervised learning, or unsupervised learning, among other techniques. In an example training process, the artificial intelligence model 310 can be trained using a set of training data that includes images of objects and corresponding ground truth data specifying the bounding boxes and classifications for those objects. The images used in the training data may be received from autonomous vehicles described herein, and the ground-truth values may be user-generated through observations and experience to facilitate supervised learning. In some embodiments, the training data may be pre-processed via any suitable data augmentation approach (e.g., normalization, encoding, any combination thereof, etc.) to produce a new dataset with modified properties to improve model generalization using ground truth.

The object tracker 320 may track objects detected in the sequences of images by the artificial intelligence model 310. The object tracker 320 may perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size, etc.). To do so, the object tracker 320 may execute a discriminative correlation filter tracker with channel and spatial reliability of tracker (CSRT) to predict a position and size of a bounding box in a second image given a first image (and corresponding bounding box) as input. In some embodiments, the object tracker 320 may utilize alternative tracking algorithms, including but not limiting to Boosting, Multiple Instance Learning (MIL), or Kernelized Correlation Filter (KCF), among others.

The object tracker 320 can determine that an object has been detected in a first image of a sequence of images captured by the sensors of the autonomous vehicle. If the object has not appeared in any previous images (e.g., a tracking process has failed to associate the object with a previously tracked object in previous images), the object tracker 320 can generate a tracking identifier for the object, and begin a new tracking process for the object in the first image and subsequent images in the sequence of images. The object tracker 320 can utilize the CSRT algorithm to learn a set of correlated filters that represent detected object and its appearance in the first image, and update these filters in each subsequent image to track the object in the subsequent images. The correlation between the filters and the image is maximized to ensure that the object is accurately located in each image, while the correlation with the background is minimized to reduce false positive detections. In each subsequent incoming image (e.g., as is it captured, or as the object tracker 320 iterates through a previously captured sequence of images, etc.), the object tracker 320 can output the predicted position and size of a bounding box for the object in the subsequent image, and compare the predicted bounding box with the actual bounding box (e.g., generated by the artificial intelligence model 310) in the subsequent image.

The object tracker 320 can associate the newly detected object with the generated tracking identifier if the Intersection over Union (IOU) of the predicted bounding box and the actual bounding box is greater than a predetermined value. The object tracker 320 can calculate the IOU as the ratio of the area of the intersection of two bounding boxes to the area of their union. To calculate the IOU, the object tracker 320 can determine the coordinates of the top-left and bottom-right corners of the overlapping region between the two bounding boxes (e.g., by subtracting determined coordinates of each bounding box). Then, the object tracker 320 can calculate the width and height of the overlap and utilize the width and height to calculate the area of the overlap. The object tracker 320 can calculate the area of union as the sum of the areas of the two bounding boxes minus the area of their overlap, and then calculate the IOU as the ratio of the area of intersection to the area of the union.

In some implementations, the object tracker 320 can utilize the Kuhn-Munkres algorithm to perform matching of bounding boxes to existing tracking identifiers. The Kuhn-Munkres algorithm can be utilized to find the optimal assignment between the predicted bounding boxes and the detected bounding boxes that minimizes the sum of the costs (or maximizes the negation of the costs) associated with each assignment. The cost of an assignment may be for example, the IOU between the bounding boxes, or in some implementations, the Euclidean distance between the centers of the bounding boxes. When executing the Kuhn-Munkres algorithm, the object tracker 320 can create a cost matrix (or other similar data structure). Each element of the matrix can represent the cost of assigning a predicted bounding box to a detected bounding box. The cost matrix may represent a bipartite graph (e.g., an adjacency matrix with each edge indicated as a cost). The object tracker 320 can determine the optimal assignment (e.g., the tracking identifier to associate with the detected bounding boxes) by optimizing for the maximum sum of the negation of the cost matrix for the pairs of bounding boxes (e.g., a maximum weight matching for the weighted bipartite graph).

In some implementations, the object tracker 320 can execute the Kuhn-Munkres algorithm to determine the best matching pairs within the bipartite graph. To do so, the object tracker 320 can assign each node in the bipartite graph a value that represents the best case of matching in the bipartite graph. For any two connected nodes in the bipartite graph, that the assigned value of two nodes is larger or equal to the edge weight. In this example, each node in the bipartite graph represents a predicted bounding box or a detected bounding box, and the predicting bounding boxes can only match to the detected bounding boxes, or vice versa. In some implementations, the values can be assigned to each of the nodes representing predicted bounding boxes, and the node value of the nodes in the bipartite graph that represent detected bounding boxes can be assigned to a node value of zero.

When executing the Kuhn-Munkres algorithm, the object tracker 320 can continuously iterate through each of the nodes in the bipartite graph determined for the cost matrix to identify an augmenting path starting from unmatched edges at the node and ending in another unmatched edge. The object tracker 320 can take the negation of the augmenting path, to identify one or more matching nodes. In some cases, when executing the Kuhn-Munkres algorithm, the object tracker 320 may be unable to resolve a perfect match through negation of the augmenting path. For the unsuccessful augmenting path, the object tracker 320 can identify all the related nodes (e.g., nodes corresponding to predicted bounding boxes) and calculate a minimum amount by which to decrease their respective node value to match with their second candidate (e.g., a node representing a corresponding detected bounding box). In order to keep the sum of linked nodes the same, the amount by which the node values are increased can be added to nodes to which said nodes are matched. In some implementations, the Kuhn-Munkres algorithm can be executed when the number of predicted bounding boxes and the number of detected bounding boxes is the same. If the number of predicted bounding boxes and the number of detected bounding boxes is different, the object tracker 320 can generate placeholder data representing fake bounding boxes to satisfy the requirements of the Kuhn-Munkres algorithm.

In some implementations, the object tracker 320 can implement an occlusion strategy, which handles cases where tracking fails for two or more consecutive images. One occlusion strategy is to delete or remove the tracking identifier when an object fails to appear (or be correctly tracked) in a subsequent image in the sequence of images. Another occlusion strategy is to only delete the tracking identifier if an object has failed to be tracked for a predetermined number of images (e.g., two consecutive images, five consecutive images, ten consecutive images, etc.). This can enable the object tracker 320 to correctly detect and track objects even in cases where the artificial intelligence model 310 fails to detect an object that is present in the sequence of images for one or more consecutive images. The object tracker 320 may also execute one or more of the operations described in connection with FIGS. 5 and 6 to determine a correction to a classification of objects detected in the sequence of images.

Velocity estimator 330 may determine the relative velocity of target objects relative to the ego vehicle. Effective mass estimator 340 may estimate effective mass of target objects, e.g., based on object visual parameters signals from an object visual parameters component and object classification signals from a target object classification component. The object visual parameters component may determine visual parameters of a target object such as size, shape, visual cues and other visual features in response to visual sensor signals, and generates an object visual parameters signal. The target object classification component may determine a classification of a target object using information contained within the object visual parameters signal, which may be correlated to various objects, and generates an object classification signal. For instance, the target object classification component can determine whether the target object is a plastic traffic cone or an animal.

In some implementations, the object tracking and classification module 300 may include a cost analysis function module. The cost analysis function module may receive inputs from other components of object tracking and classification module 300 and generates a collision-aware cost function. The system 100, 250 may apply this collision-aware cost function in conjunction with other functions used in path planning. In an embodiment, the cost analysis function module provides a cost map that yields a path that has appropriate margins between the autonomous vehicle and surrounding target objects.

Objects that may be detected and analyzed by the object tracking and classification module 300 include moving objects such as other vehicles, pedestrians, and cyclists in the proximal driving area. Target objects may include fixed objects such as obstacles; infrastructure objects such as rigid poles, guardrails or other traffic barriers; and parked cars. Fixed objects, also herein referred to herein as static objects and non-moving objects can be infrastructure objects as well as temporarily static objects such as parked cars. Externally-facing sensors may provide system 100, 250 (and the object tracking and classification module 300) with data defining distances between the ego vehicle and target objects in the vicinity of the ego vehicle, and with data defining direction of target objects from the ego vehicle. Such distances can be defined as distances from sensors, or sensors can process the data to generate distances from the center of mass or other portion of the ego vehicle.

In an embodiment, the system 100, 250 collects data on target objects within a predetermined region of interest (ROI) in proximity to the ego vehicle. Objects within the ROI satisfy predetermined criteria for likelihood of collision with the ego vehicle. The ROI is alternatively referred to herein as a region of collision proximity to the ego vehicle. The ROI may be defined with reference to parameters of the vehicle control module 206 in planning and executing maneuvers and/or routes with respect to the features of the environment. In an embodiment, there may be more than one ROI in different states of the system 100, 250 in planning and executing maneuvers and/or routes with respect to the features of the environment, such as a narrower ROI and a broader ROI. For example, the ROI may incorporate data from a lane detection algorithm and may include locations within a lane. The ROI may include locations that may enter the ego vehicle's drive path in the event of crossing lanes, accessing a road junction, swerve maneuvers, or other maneuvers or routes of the ego vehicle. For example, the ROI May include other lanes travelling in the same direction, lanes of opposing traffic, edges of a roadway, road junctions, and other road locations in collision proximity to the ego vehicle.

Figure 4:
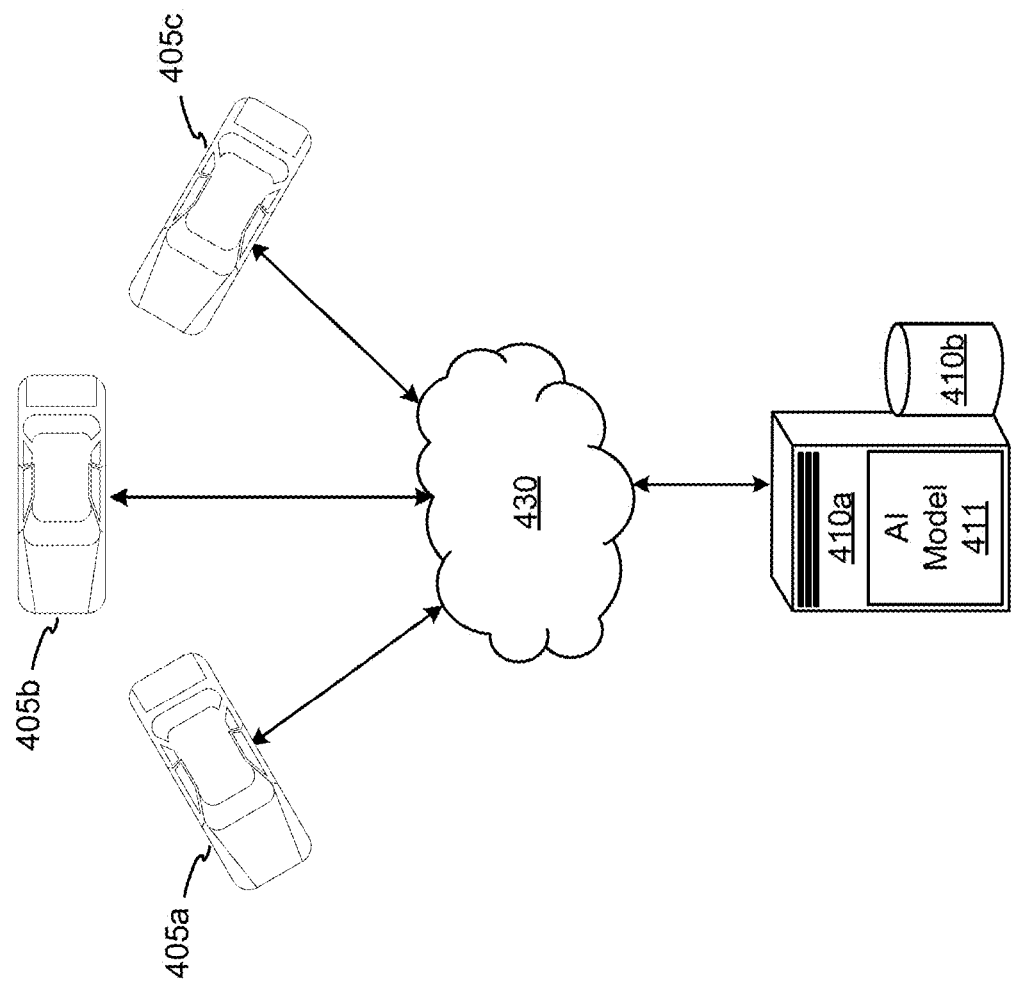
FIG. 4 is a schematic of a system for training artificial intelligence models with improved accuracy using image data, according to an embodiment.

FIG. 4 illustrates components a system 400 for training artificial intelligence models with improved accuracy using image data, according to an embodiment. The system 400 may include a remote server 410a, system database 410b, artificial intelligence models 411, and autonomous vehicles 405a-d (collectively or individually the autonomous vehicle(s) 405). In some embodiments, the system 400 may include one or more administrative computing devices that may be utilized to communicate with and configure various settings, parameters, or controls of the system 100. Various components depicted in FIG. 4 may be implemented to receive and process images captured by the autonomous vehicles 405 to train the artificial intelligence models 411, which can subsequently be deployed to the autonomous vehicles 405 to assist with autonomous navigation processes. The above-mentioned components may be connected to each other through a network 430. Examples of the network 430 may include, but are not limited to, private or public local-area-networks (LAN), wireless LAN (WLAN) networks, metropolitan area networks (MAN), wide-area networks (WAN), cellular communication networks, and the Internet. The network 430 may include wired and/or wireless communications according to one or more standards and/or via one or more transport mediums.

The system 400 is not confined to the components described herein and may include additional or other components, not shown for brevity, which are to be considered within the scope of the embodiments described herein.

The communication over the network 430 may be performed in accordance with various communication protocols such as Transmission Control Protocol and Internet Protocol (TCP/IP), User Datagram Protocol (UDP), and IEEE communication protocols. In one example, the network 430 may include wireless communications according to Bluetooth specification sets or another standard or proprietary wireless communication protocol. In another example, the network 430 may also include communications over a cellular network, including, e.g., a GSM (Global System for Mobile Communications), CDMA (Code Division Multiple Access), EDGE (Enhanced Data for Global Evolution) network.

The autonomous vehicles 405 may be similar to, and include any of the structure and functionality of, the autonomous truck 102 of FIG. 1. The autonomous vehicles 405 may include one or more sensors, communication interfaces or devices, and autonomy systems (e.g., the autonomy system 150 or the autonomy system 250, etc.). The autonomy systems of the autonomous vehicles 405 may include an object detection and tracking module (e.g., the object detection and tracking module 300 of FIG. 3). Each autonomous vehicles 405 can transmit sensor data and any data generated or processed by the autonomy system of the autonomous vehicle 405 to the remote server 410a. The autonomous vehicles 405 may transmit the information as the autonomous vehicle 405 operates, or after the autonomous vehicle 405 has ceased operation (e.g., parked, connected to a predetermined wireless or wired network, etc.).

The remote server 410a may receive sequences of images captured during operation of the autonomous vehicles 405, and perform the correction techniques described herein to generate data for training the artificial intelligence models 411. In some embodiments, the remote server 410a can include, or implement any of the functionality of, the object detection and tracking module 300 of FIG. 3. For example, the remote server 410a may receive sequences of images received from the autonomous vehicles 405a, and store the sequences of images in the system database 110b. The remote server 410a can store the sequences of images in association with metadata received from or generated based on communications with the autonomous vehicles 405. The metadata may include, for example, an identifier of autonomous vehicle 405, a timestamp corresponding to one or of the images or the sequence of images, bounding boxes detected by the autonomy system 250 of the autonomous vehicle 405, classifications determined by the autonomy system 250 of the autonomous vehicle 405, tracking identifiers corresponding to detected bounding boxes, distance information for detected objects in the sequences of images, any sensor data described herein, among other metadata.

The remote server 410a can implement the functionality described in connection with FIG. 5 to determine one or more corrections to classifications generated by the autonomous vehicles 405. The corrections can be utilized as additional ground truth data for training the artificial intelligence model, which can be generated by the remote server 410a and stored in the system database 410b. The corrections can be determined, as described herein, by utilizing tracking information (e.g., the tracking identifiers and the bounding boxes to which they correspond) associated with objects depicted in sequences of images. The remote server 410a can determine that a classification of a tracked object in an image may not match other classifications within the sequence of images. The remote server 410a can perform a voting algorithm using the classifications corresponding to the detected object in each image of a sequence of images in which the object was detected and tracked (e.g., associated with a common tracking identifier).

In some implementations, the remote server 410a can utilize a majority-voting algorithm, in which the classification that occurs most common in the corresponding images is chosen as the corrected classification. In some implementations, the remote server 410a can utilize a normalized weighted voting algorithm. When executing the normalized weighted voting algorithm, the remote server 410a can divide the instances in which the object was detected in the sequence of images groups according to the distance of the object from the autonomous vehicle 405 that captured the sequence of images. The distance can be determined by the autonomous vehicle 405 or the remote server 410a based sensor data captured by the sensors of the autonomous vehicle 405. The remote server 410a can determine a weight value for each group, corresponding to the classification accuracy at different predetermined distances, for example. The remote server 410a can determine a candidate class label based on confidence values (e.g., generated by the artificial intelligence model that detected the bounding box in the sequence of images) associated with the detected bounding box or classification. The remote server 410a can determine a weight value for the candidate class label of each group based on a distance coefficient for the respective group. The remote server 410a can calculate the weighted sum of class confidence to determine the voted class label among the groups. In an embodiment, the distance coefficient is a hyper parameter, which can be tuned according to the classification performance of the various artificial intelligence models described herein (e.g., the artificial intelligence model 310) at different distance ranges.

In some implementations, the remote server 410a can detect one or more images in a consecutive sequence of images in which detection of an object (e.g., generation of an accurate bounding box) has failed. For example, the remote server 410a can iterate through a sequence of images and identify whether bounding boxes corresponding to a common tracking identifier appear in consecutive images. If an image between two images is missing a bounding box for the common tracking identifier of an object, the remote server 410a can determine that the respective bounding box is missing. The remote server 410a can generate a corrected bounding box by estimating the position and size of the bounding box for the image. To do so, the remote server 410a can execute the CSRT tracking algorithm to estimate the position and position and size of a bounding box for the object in the image given the previous image in the sequence in which the object was correctly detected.

The artificial intelligence models 411 may be stored in the system database 410b and may include artificial intelligence models that can detect and classify objects and images. For example, the artificial intelligence models 411 can include the artificial intelligence model 310 of FIG. 3 for one or more autonomous vehicles 405. In some implementations, the artificial intelligence models 411 may be generated or trained for on different types of cameras, autonomous vehicles 405, or environments. For example, the artificial intelligence models 411 may include multiple artificial intelligence models, each of which may be trained for a specific type of autonomous vehicle 405, a specific set of sensors deployed on an autonomous vehicle 405, or a particular environment in which one or more autonomous vehicles 405 may be deployed. One or more of the artificial intelligence models 411 may be derived from a similar base model, which may be fine-tuned for particular applications.

The artificial intelligence models 411 can be or may include one or more neural networks. The artificial intelligence models 411 can be a single shot multi-box detector, and can process an entire input image in one forward pass. Processing the entire input image in one forward pass improves processing efficiency, and enables the artificial intelligence models 411 to be utilized for real-time or near real-time autonomous driving tasks. In some embodiments, the input to the artificial intelligence models 411 may be pre-processed, or the artificial intelligence models 411 itself may perform additional processing on the input data. For example, an input image to the artificial intelligence models 411 can be divided into a grid of cells of a configurable (e.g., based on the architecture of the artificial intelligence models 411) size. The artificial intelligence models 411 can generate a respective prediction (e.g., classification, object location, object size/bounding box, etc.) for each cell extracted from the input image. As such, each cell can correspond to a respective prediction, presence, and location of an object within its respective area of the input image.

The artificial intelligence models 411 may also generate one or more respective confidence values indicating a level of confidence that the predictions are correct. If an object represented in the image spans multiple cells, the cell with the highest prediction confidence can be utilized to detect the object. The artificial intelligence models 411 can output bounding boxes and class probabilities for each cell, or may output a single bounding box and class probability determined based on the bounding boxes and class probabilities for each cell. In some embodiments, the class and bounding box predictions are processed by non-maximum suppression and thresholding to produce final output predictions. The artificial intelligence models 411 may be or may include a deep CNN, which may include one or more layers that may implement machine-learning functionality. The one or more layers can include, in a non-limiting example, convolutional layers, max-pooling layers, activation layers and fully connected layers, among others.

The remote server 410a can train one or more of the artificial intelligence models 411 using training data stored in the system database 410b. In an example training process, the artificial intelligence models 411 can be trained using a set of training data that includes images of objects and corresponding ground truth data specifying the bounding boxes and classifications for those objects. The images used in the training data may be received from the autonomous vehicles 405, and the ground-truth values may be user-generated through observations and experience to facilitate supervised learning. In some embodiments, at least a portion of the ground truth data can be generated by the remote server 410a using the correction techniques described herein. In some embodiments, the training data may be pre-processed via any suitable data augmentation approach (e.g., normalization, encoding, any combination thereof, etc.) to produce a dataset with modified properties to improve model generalization using the ground truth.

The remote server 410a can train an artificial intelligence model 411, for example, by performing supervised learning techniques to adjust the parameters of the artificial intelligence model 411 based on a loss computed from the output generated by the artificial intelligence model 411 and ground truth data corresponding to the input provided to the artificial intelligence model 411. Inputs to the artificial intelligence model 411 may include images or sequences of images captured during operation of autonomous vehicles 405, and stored in the system database 110b. The artificial intelligence model 411 may be trained on a portion of the training data using a suitable optimization algorithm, such as stochastic gradient descent. The remote server 410a can train the artificial intelligence model 411 by minimizing the calculated loss function by iteratively updating the trainable parameters of the artificial intelligence model 411 (e.g., using backpropagation, etc.). The remote server 410a can evaluate the artificial intelligence model 411 on a held-out portion of the training data (e.g., validation set that was not used to train the artificial intelligence model 411) to assess the performance of the artificial intelligence model 411 on unseen data. The evaluation metrics used to assess the model's performance may include accuracy, precision, recall, and F1 score, among others.

The remote server 410a can train an artificial intelligence model 411 until a training termination condition is met. Some non-limiting training termination conditions include a maximum number of iterations being met or a predetermined performance threshold being met. The performance threshold can be satisfied when the artificial intelligence model 411 reaches a certain level of accuracy, F1 score, precision, recall, or any other relevant metric on a validation set. The remote server 410 can provide the trained artificial intelligence model 411 one or more autonomous vehicles 405 for which the artificial intelligence model 411 was trained. The autonomous vehicle(s) 405 can then utilize the artificial intelligence model 411 to detect and classify objects in real-time or near real-time, as described herein.

The remote server 410a can update one or more of the artificial intelligence models 411 (e.g., by retraining, fine-tuning, or other types of training processes) when sequences of images are received from the autonomous vehicles 405 and utilized to produce additional training data. The remote server 410a (or the autonomy systems of the autonomous vehicles 405) can generate the additional training data by determining corrections to classifications made by the artificial intelligence model executing on the autonomous vehicle. The corrected classifications and bounding boxes can be utilized as ground truth data for the images in the sequences of images to which they correspond. Further details of the correction and training process are described in connection with FIG. 5. Although the artificial intelligence models 411 can include neural networks trained using supervised learning techniques, it should be understood that any alternative and/or additional machine learning model(s) may be used to implement similar learning engines.

FIG. 5 depicts an example augmentation for a physical environment, in accordance with present implementations. As illustrated by way of example in FIG. 5, an example augmentation for a physical environment 500 can include at least a first roadway object 510, a second roadway object 520, clustered roadway objects 530, and roadside objects 540. Augmentations for a physical environment, as shown in FIG. 5, including bounding boxes (e.g., around the first roadway object 510, the second roadway object 520, clustered roadway objects 530, etc.) may be provided by a server (e.g., the server 410a, etc.) or another type of computing device (e.g., autonomous vehicles 405, the autonomy system 150 of the truck 102 that is shown in FIG. 1, etc.)

The first roadway object 510 can be a vehicle (e.g., truck, car, motorcycle, etc.) moving at a nearly constant speed relative to an autonomous vehicle (e.g., an autonomous vehicle that generates the example augmentation shown in FIG. 5). As shown in FIG. 5, the first roadway object 510 can be detected in the roadway and an accurate bounding box can be generated, as depicted with the first roadway object 510, for the physical environment (e.g., a bounding box associated with the image data of a physical environment at one or more moments in time) shown in FIG. 5. As can be seen in FIG. 5, the first roadway object 510 may be traveling in one or more lanes (e.g., within a first lane) of a multiple lane roadway. Additionally, as can also be seen in FIG. 5, the first roadway object 510 may also be the closest object that the autonomous vehicle detects in the roadway (e.g., the first roadway object 510 is closer to the autonomous vehicle than the second roadway object 520 or the clustered roadway objects 530.)

The second roadway object 520 can be another vehicle (e.g., a truck, car, motorcycle, van, etc.) detected by an autonomous vehicle (e.g., autonomous vehicles 405) and that is moving at a nearly constant speed, or disposed in a substantially constant position, relative to the autonomous vehicle (e.g., an autonomous vehicle that generates the example augmentation shown in FIG. 5). Additionally, or in the alternative, the second roadway object 520 can be a vehicle moving at a varying speed or at a varying location relative to the autonomous vehicle (e.g., a car changing lanes in front of an autonomous vehicle).

As shown in FIG. 5, the second roadway object 520 can be detected in the roadway and an accurate bounding box can be generated, as depicted for the physical environment (e.g., a bounding box associated with the image data of a physical environment at one or more moments in time) shown in FIG. 5. As can be seen in FIG. 5, the second roadway object 520 may be traveling within one or more or more lanes (e.g., within a second lane) of a multiple lane roadway. Additionally, as can also be seen in FIG. 5, the second roadway object 520 may also be further from the autonomous vehicle than the first roadway object 510 (e.g., located further from the autonomous vehicle at the time of detection for both the first roadway object 510 and the second roadway object 520.)

The clustered roadway objects 530 can be one or more substantially stationary (e.g., parked and/or stopped) vehicles, which have been detected by the autonomous vehicle and for which accurate bounding boxes have been generated (e.g., as can be seen in FIG. 5), within one part of the roadway (e.g., a parking lane or shoulder). The clustered roadway objects 530 can include an overlaid roadway objects 532. For example, the overlaid roadway objects can be one or more of the vehicles of the clustered roadway objects 530 that are 'overlapping' (e.g., obstructed from view by one or more vehicles of the clustered roadway objects 530), as shown in FIG. 5. The clustered roadway objects 530, including the overlaid roadway objects 532, can include several bounding boxes for the one or more vehicles detected by the autonomous vehicle at that point in time (e.g., at a timestamp associated with the image data of the augmentation shown in FIG. 5.)

The roadside objects 540 can be one or more substantially stationary (e.g., parked and/or stopped) vehicles, which have been detected by the autonomous vehicle and for which accurate bounding boxes have been generated (e.g., as can be seen in FIG. 5), that are located outside of the roadway (e.g., on the opposite side of a median adjacent to the roadway.) The roadside objects 540 can include an overlaid roadside objects 542.

The overlaid roadside objects 542 can include one or more of the vehicles of the roadside objects 540 that are detected by the autonomous vehicle (and for which an accurate bounding box has been generated), and that are 'overlapping' with (e.g., obstructed from view by) one or more vehicles of the roadside objects 540, as shown in FIG. 5. The roadside objects 540, including the overlaid roadside objects 542, can include several bounding boxes for the one or more vehicles detected by the autonomous vehicle at that point in time (e.g., at a timestamp associated with the image data of the augmentation shown in FIG. 5).

FIG. 6 depicts an example trajectory indicators, in accordance with present implementations. As illustrated by way of example in FIG. 6, an example trajectory indicators 600 can include at least a forward trajectory 610, a lateral trajectory 620, and an ungrouped trajectory 630.

The forward trajectory 610 can include image data (e.g., one or more bounding boxes) that indicates the trajectory of an object (e.g., a first roadside object 510) that is detected by an autonomous vehicle (e.g., one of the autonomous vehicles 405, etc.) and that then moves towards the autonomous vehicle over time (e.g., a parked car that is detected at a distance and is eventually passed by the autonomous vehicle). For example, the forward trajectory 610 can include an earlier position indicator 614 (e.g., a bounding box assigned to the detected object at a first time) and can also include a later position indicator 612. More specifically, the forward trajectory can indicate the trajectory of an object as it moves from the earlier position indicator 614 to the later position indicator 612 (e.g., the trajectory of the object as it approaches an autonomous vehicle) at a steady pace over time.

The later position indicator 612 can correspond to the position of an object (e.g., the objection associated with forward trajectory 610) at a later time or timestamp (e.g., the last time the object is detected before being passed by the autonomous vehicle) associated with the forward trajectory 610. More specifically, the later position indicator 612 can indicate the position of the object at the end of its forward trajectory 610. Conversely, the earlier position indicator 614 can correspond to the position of an object (e.g., the object associated with the forward trajectory 610) at a time, or a timestamp, that is earlier than the time associated with later position indicator 612 (e.g., the first time the object is detected before beginning its forward trajectory). Accordingly, the earlier position indicator 614 can indicate the position of the object at the start of the forward trajectory 610.

The time or timestamp associated with each bounding box (e.g., the timestamp of the earlier position indicator 614 and the timestamp of the later position indicator 612) can be indicated by the image data for that bounding box, such that the relative timestamps between each of the bounding boxes of a trajectory indicator (e.g., each of the bounding boxes of forward trajectory 610) is indicated visually by the image data. For example, the timestamp associated with a bounding box (e.g., the time of later position indicator 612 relative to the other bounding boxes within the same image data) may be indicated by the tint of the color used for that bounding box (e.g., relative to the tint of the other bounding boxes included in the same image data). Accordingly, a long period of time can be indicated in the trajectory of an object for which the image data includes bounding boxes having a large difference in brightness. Similarly, a trajectory associated with image data including bounding boxes with little difference in brightness can indicate that trajectory occurs over a relatively short amount of time (e.g., indicating a small difference between the timestamps of the bounding boxes). As can be appreciated, however, in other examples the timestamps (or relative times) of the bounding boxes can be indicated by other visual characteristics, including, for example, a brightness, a color, a saturation, a tint, a hue, a color gradient (e.g., from blue to red, etc.), an opacity, and the like.

The lateral trajectory 620 can include image data (e.g., a plurality of bounding boxes with their corresponding colors) to indicate a laterally moving object (e.g., depicting the different positions of the object) over time. For example, the lateral trajectory 620 can correspond to the trajectory of a vehicle that is switching between one or more lanes as it moves to the right on a multilane roadway. Additionally, in another example, the lateral trajectory 620 can correspond to the trajectory of an object (e.g., a vehicle) moving laterally in front of, and in a direction of travel that is perpendicular to, the autonomous vehicle; such as a vehicle crossing in front of an autonomous vehicle at a stop sign. The lateral trajectory 620 can include a later position indication 622, and an earlier position indication 624. The later position indication 622 can correspond to a position of an object at a later time (e.g., a bounding box associated with a later timestamp), such as the position of a vehicle associated with the lateral trajectory 620 at or near the end of lateral trajectory 620. The earlier position indication 624 can correspond to a position of an object at an earlier time (e.g., a bounding box associated with an earlier timestamp), such as the position of a vehicle associated with the lateral trajectory 620 at or near the beginning of the lateral trajectory 620.

The ungrouped trajectory 630 can include image data (e.g., a plurality of bounding boxes with their corresponding colors) that indicates an unknown or unclassified type of object movement (e.g., an erratic driving pattern). The ungrouped trajectory 630 can include a later position indication 632, and an earlier position indication 634. The later position indication 632 can correspond to a position of an object at a later time (e.g., a bounding box associated with a later timestamp), such as the position of a vehicle associated with the ungrouped trajectory 630 at the end of the ungrouped trajectory 630. The earlier position indication 634 can correspond to a position of an object at an earlier time (e.g., a bounding box associated with an earlier timestamp), such as the position of a vehicle associated with the ungrouped trajectory 630 at or near the beginning of the ungrouped trajectory 630 (e.g., a bounding box associated with the latest timestamp relative to the timestamps associated with the bounding boxes depicted in the ungrouped trajectory 630).

Figure 7:
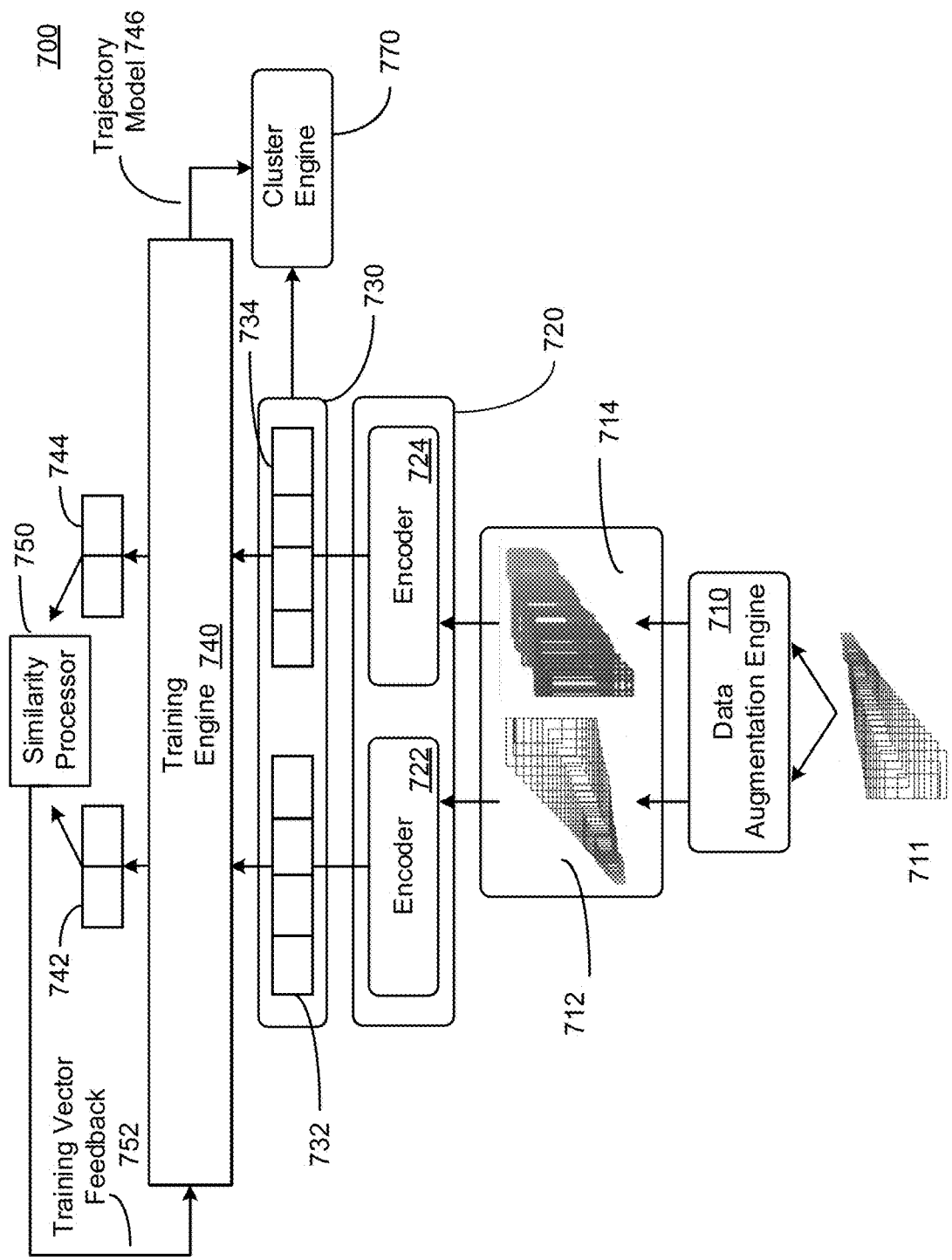
FIG. 7 depicts an example trajectory identification engine, in accordance with present implementations.

FIG. 7 depicts an example trajectory identification engine, in accordance with present implementations. As illustrated by way of example in FIG. 7, an example trajectory identification engine 700 can include at least a data augmentation engine 710, an image encoder engine 720, an image vectorization engine 730, a training engine 740, a trajectory model 746, and a similarity processor 750.

The data augmentation engine 710 can multiply the quantity of image data input to the trajectory identification engine. The data augmentation engine 710 can include an input image 711, a first output image 712, and a second output image 714. For example, the data augmentation engine 710 may implement one or more models (e.g., one or more data augmentation models) to output a plurality of output images (e.g., output images 714 and 715). Alternatively, the data augmentation engine 710 can include a greater number of output images and need not be limited to two output images.

The input image 711 can comprise image data of a trajectory indicator (e.g., a plurality of bounding boxes and their corresponding colors), including, for example, a forward trajectory (e.g., forward trajectory 610). As can be appreciated, the input image 711 can include image data of any trajectory indicator including, for example, an ungrouped, or unclassified, trajectory indicator (e.g., ungrouped trajectory 630). The first output image 712 can include image data based on, but not necessarily identical to, the image data of the input image 711. For example, the first output image 712 can include image data for the trajectory indicator of the input image 711 that has been mirrored and/or rotated relative to the input image 711 provided to the data augmentation engine 710. Additionally, or in the alternative, the first output image 712 can include image data that results from one or more other modifications to the image data of the input image 711. The second output image 714 can include image data based on, but not identical to, the image data of the input image 711. For example, the second output image 714 can include image data that is a 'zoomed in' view of a portion of the trajectory indicator of the input image 711 (e.g., image data that is 'zoomed in' on the earlier bounding boxes shown in the input image 711).

The image encoder engine 720 can receive the output images of the data augmentation engine 710 (e.g., the first output image 712 and the second output image 714) and output a plurality of image vectors, with each image vector corresponding to an image received by the encoder engine 720. The image encoder engine 720 can include an encoders 722 and 724. Alternatively, the image encoder engine 720 can include any number of encoders and need not be limited to the two encoders 722, 724 shown in FIG. 7. The encoders 722 and 724 can receive the image data output by the data augmentation engine 710 (e.g., the first output image 712 and the second output image 714) and may generate a corresponding image vector for that image data. For example, the encoder 722 may generate an image vector 732 based on the first output image 712 and the encoder 724 may generate an image vector 734 based on the second output image 714. For example, the encoders 722, 724 can map the image data of the first and second output images 712, 714 to the image vectors 732, 734 comprised of corresponding numerical values reflecting the information depicted in the image data of the first and second output images 712, 714 (e.g., the plurality of bounding boxes and their colors). The image vector container 730 can contain one or more image vectors (e.g., image vectors 732, 734) output by the image encoder engine 720.

The training engine 740 can generate a plurality of similarity vectors (e.g., similarity vectors 742, 744) based on the image vectors 732, 734 output by the image encoder engine 720 (e.g., the one or more image vectors contained in image vector container 730). For example, the training engine 740 can include, as inputs, the image vectors 732 and 734. Additionally, in some examples, the training engine 740 can include an artificial intelligence model (e.g., a trained machine learning model and/or a machine learning model trained by the training engine 740) configured to determine a similarity vector for each image vector input to the training engine 740, which similarity vector contains a indicative of the degree of similarity between the image vectors (e.g., image vectors 732, 734) input to the training engine 740. Accordingly, in some examples, the training engine 740 can output the similarity vector 742 corresponding to the image vector 732 and can also output the similarity vector 744 corresponding to image vector 734.

The training engine 740 can output the similarity vectors to both the similarity processor 750 and the cluster engine 770. Relatedly, the similarity vectors 742 and 744 can indicate the degree of similarity between the images 712, 714. Moreover, in some examples the similarity vectors 742 and 744 can indicate the degree of similarity between the images 712, 714 and a trajectory indicator, which is associated with a type of image data (e.g., forward trajectory 610).

The trajectory model 746 can include one or more groupings, or clusters, of the plurality of images input to the training engine 740. For example, the trajectory model 746 can include one or more clusters of images (or image vectors and/or corresponding similarity vectors) associated with the trajectory of an object over time. For example, the trajectory model 746 can include clusters of one or more images (or image vectors) that have been determined to be similar to each other (or which have been otherwise clustered and/or grouped together) by the training engine 740 based on the image vectors for those images.

The similarity processor 750 can determine whether the similarity vectors for a plurality of images (e.g., similarity vectors 742 and 744) are greater than a threshold value and, if so, it can modify those values of the similarity vectors to increase the degree of similarity indicated by the similarity vectors for those images. Conversely, if the similarity processor 750 determines that the similarity vectors for a plurality of images (e.g., the similarity vectors 742 and 744 for images 712 and 714) are below a threshold value then the similarity processor 750 may modify those values of the similarity vectors to decrease the degree of similarity indicated by the similarity vectors of those images. The similarity processor 750 can include a training vector feedback 752. The training vector feedback 752 can provide the similarity vectors (e.g., similarity vectors 742, 744) modified by the similarity processor 750 to the training engine 740 to continue to create one or more groupings of the image vectors input to the training engine 740. Accordingly, the similarity processor 750 can facilitate the formation of one or more groupings or clusters of the image vectors (or the corresponding image data) provided to the training engine 740 based on the threshold value used by the similarity processor 750. In some examples, the similarity processor can facilitate the formation of one or more clusters of image vectors (or corresponding image data) by converging similarity vectors having properties satisfying a similarity threshold, and diverging similarity vectors not having properties satisfying the similarity threshold, to modify the similarity vectors (e.g., similarity vectors 742, 744).

For example, the system can include processors configured to determine, via the trained artificial intelligence model, whether an input tracking image satisfies a similarity threshold indicating that a trajectory of the input tracking image corresponds to one or more of the trajectories of the objects. For example, the system can include the processors configured to generate, via the trained artificial intelligence model, the indication of the first type of trajectory to identify a first type of movement of an object corresponding to the input tracking image, in response to a determination that the input tracking image satisfies the similarity threshold. For example, the system can include the first type of movement corresponding to a trajectory linked with a predetermined classification. For example, the system can include processors configured to generate, by the one or more processors via the trained artificial intelligence model, the indication of the first type of trajectory to identify a second type of movement of the object, in response to a determination that the input tracking image does not satisfy the similarity threshold. For example, the system can include the second type of movement corresponding to a trajectory excluded from a predetermined classification. For example, the system can include processors generating, by the one or more processors via a second artificial intelligence model, the plurality of bounding boxes. For example, the trajectories corresponding to movement of the objects in a physical environment depicted in the sequence of images.

Figure 8:
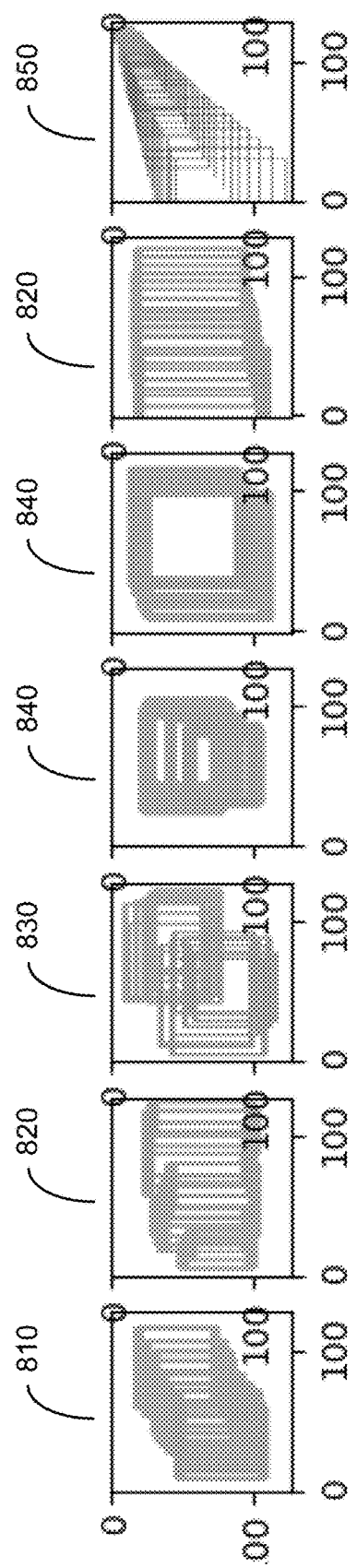
FIG. 8 depicts an example grouped trajectories, in accordance with present implementations.

FIG. 8 depicts an example grouped trajectories, in accordance with present implementations. As illustrated by way of example in FIG. 8, an example grouped trajectories 800 can include at least a forward trajectory indication 810, a lateral trajectory indication 820, an indication of clustered forward trajectories 830, a forward trajectory indication 840, and a differential forward trajectory 850.

The forward trajectory indication 810 can include image data (e.g., one or more bounding boxes) that indicates the trajectory of an object (e.g., a first roadside object 510) that is detected by an autonomous vehicle (e.g., one of the autonomous vehicles 405, etc.) as it moves towards the autonomous vehicle over time (e.g., a parked car that is detected at a distance and is eventually passed by the autonomous vehicle).

The lateral trajectory indication 820 can include image data (e.g., a plurality of bounding boxes with their corresponding colors) to indicate a laterally moving object (e.g., depicting the different lateral positions of the object) over time. For example, the lateral trajectory indication 820 can correspond to the trajectory of a vehicle that is switching between one or more lanes as it moves to the right on a multilane roadway.

The indication of clustered forward trajectories 830 can include image data (e.g., a plurality of bounding boxes with their corresponding colors) indicating two objects detected by the autonomous vehicle and moving in front of the autonomous vehicle. For example, the indication of clustered forward trajectories 830 can include image data (e.g., bounding boxes with their corresponding colors) for two vehicles detected by the autonomous vehicle and that are driving in the same lane as, and in front of, the autonomous vehicle.

The forward trajectory indication 840 can include image data (e.g., a plurality of bounding boxes with their corresponding colors) indicating an object detected in front of the autonomous vehicle and that is moving towards the autonomous vehicle. For example, the forward trajectory indication 840 can describe the movement of a vehicle in front of the autonomous vehicle (e.g., in the same lane of the roadway) that has stopped in traffic while the autonomous vehicle is moving towards it.

The differential forward trajectory 850 can include image data (e.g., one or more bounding boxes) that indicates the trajectory of an object (e.g., a first roadside object 510) that is detected by an autonomous vehicle (e.g., one of the autonomous vehicles 405, etc.) as it moves towards the autonomous vehicle over time (e.g., a parked car that is detected at a distance and is eventually passed by the autonomous vehicle).

Figure 9:
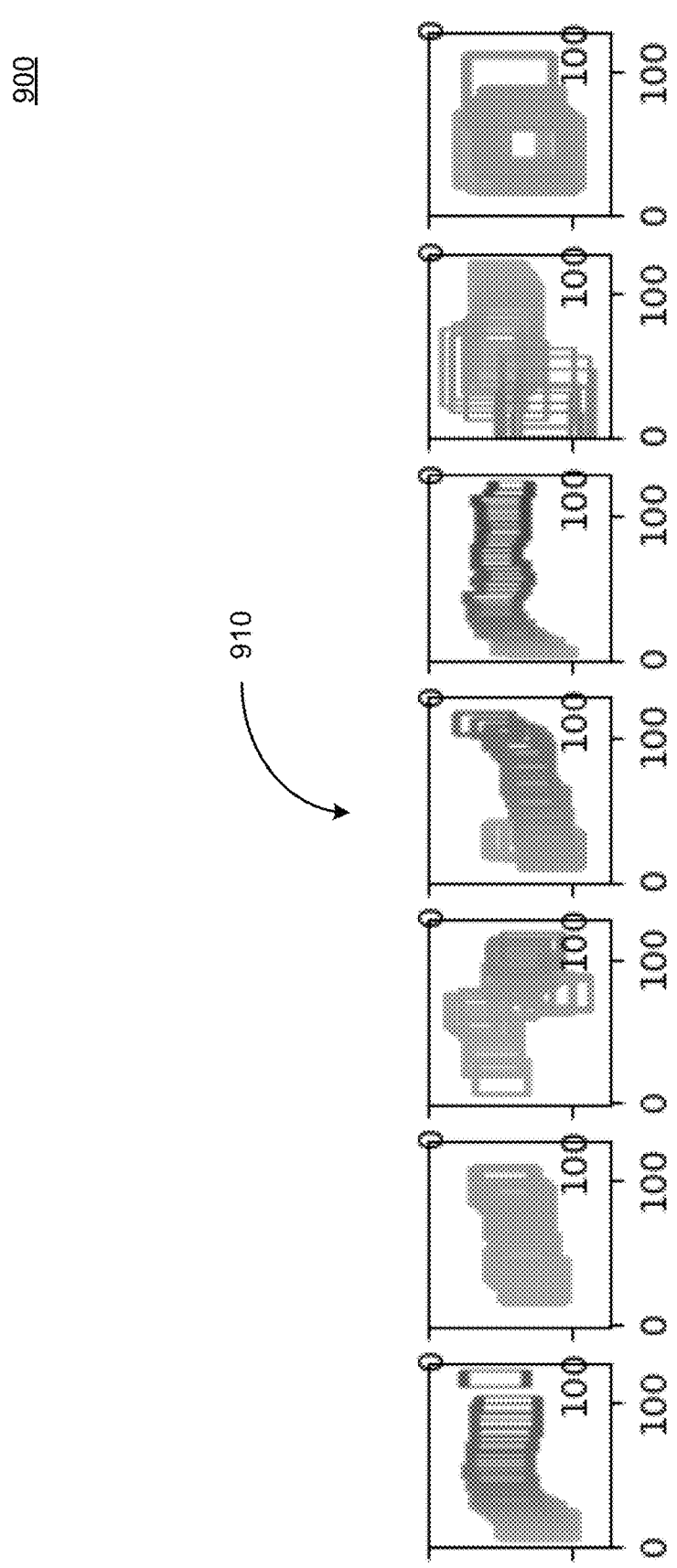
FIG. 9 depicts an example ungrouped trajectories, in accordance with present implementations.

FIG. 9 depicts an example ungrouped trajectories, in accordance with present implementations. As illustrated by way of example in FIG. 9, an example ungrouped trajectories 900 can include at least an ungrouped trajectory indications 910.

The ungrouped trajectory indications 910 can include image data (e.g., one or more bounding boxes and their corresponding colors) that indicates an unknown or erratic trajectory of an object (e.g., a vehicle swerving back and forth between traffic, a vehicle moving in a sudden irregular way (e.g., due to weather conditions), and the like). The ungrouped trajectory indications 910 can, therefore, relate to one or more irregular trajectories of an object that are dissimilar from other trajectories (or their corresponding image data) provided as input to the system (e.g., input to the training model 740).

Figure 10:
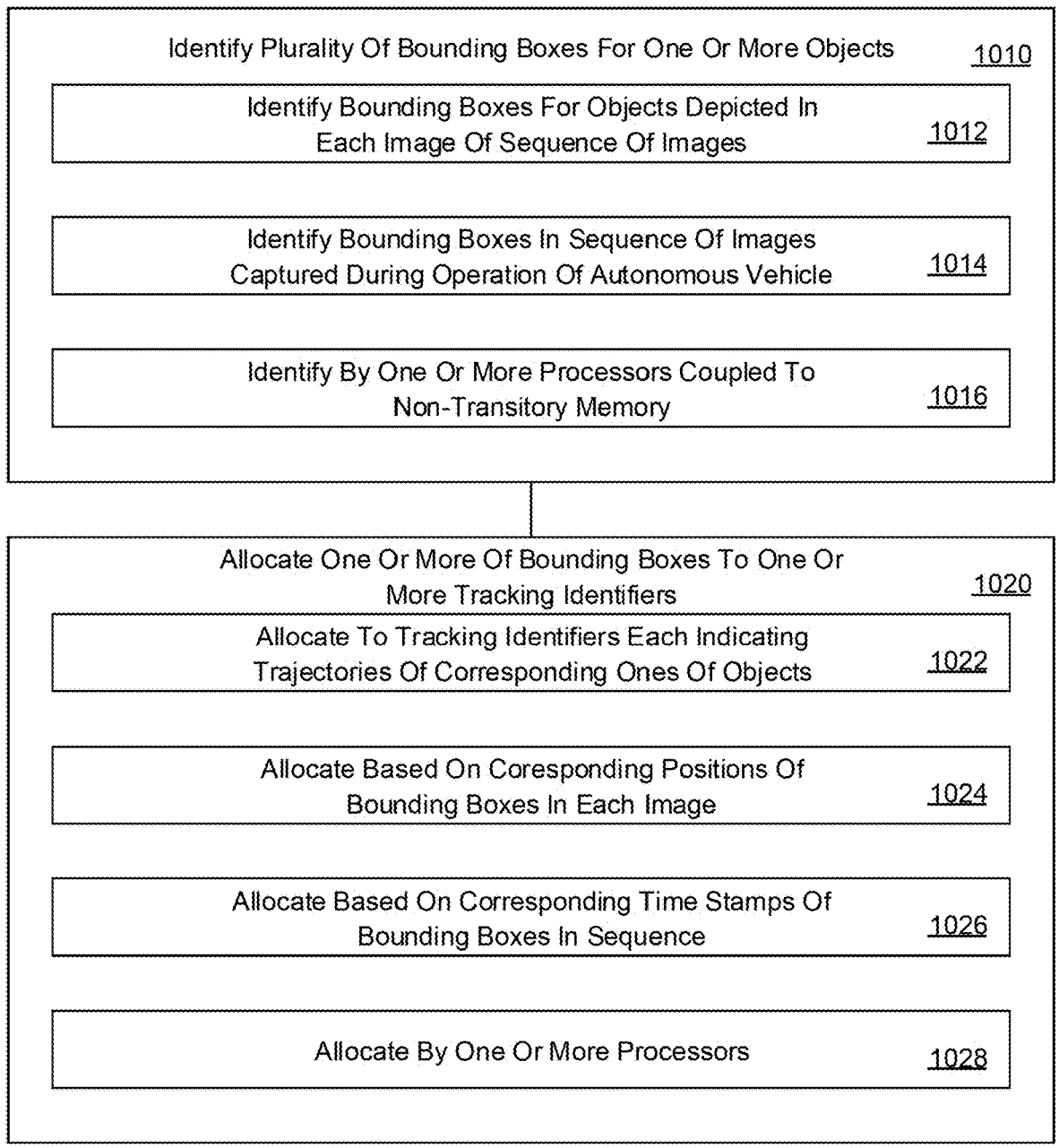
FIG. 10 depicts an example method of using artificial intelligence to determine trajectory type from image data, in accordance with present implementations.

FIG. 10 depicts an example method of for using artificial intelligence to determine trajectory type from image data, in accordance with present implementations. The method 1000 can be performed by at least the processor 210 of the autonomy system 250 depicted in FIG. 2. However, in some embodiments, one or more of the steps may be performed by a different processor, server, or any other computing device. For instance, one or more of the steps may be performed via a cloud-based service including any number of servers, which may be in communication with the processor of the autonomous vehicle and/or its autonomy system.

Although the steps are shown in FIG. 10 having a particular order, it is intended that the steps may be performed in any order. It is also intended that some of these steps may be optional. The method 1000 may be executed to improve the processing of image data collected from cameras mounted on autonomous vehicles by correcting incorrect classifications of the trajectory for detected objects.

At 1010, the method 1000 can identify a plurality of bounding boxes for one or more objects. For example, the method can include generating, by the one or more processors via a second artificial intelligence model, the plurality of bounding boxes. At 1012, the method 1000 can identify bounding boxes for objects depicted in each image of a sequence of images. At 1014, the method 1000 can identify bounding boxes in a sequence of images captured during operation of an autonomous vehicle. At 1016, the method 1000 can identify by one or more processors coupled to non-transitory memory.

At 1020, the method 1000 can allocate one or more of the bounding boxes to one or more tracking identifiers. At 1022, the method 1000 can allocate to tracking identifiers each indicating trajectories of corresponding ones of the objects. At 1024, the method 1000 can allocate based on corresponding positions of the bounding boxes in each image. At 1026, the method 1000 can allocate based on corresponding time stamps of the bounding boxes in the sequence. At 1028, the method 1000 can allocate by the one or more processors.

FIG. 11 depicts an example method of for using artificial intelligence to determine trajectory type from image data, in accordance with present implementations. The method 1100 can be performed by at least the processor 210 of the autonomy system 250 depicted in FIG. 2. However, in some embodiments, one or more of the steps may be performed by a different processor, server, or any other computing device. For instance, one or more of the steps may be performed via a cloud-based service including any number of servers, which may be in communication with the processor of the autonomous vehicle and/or its autonomy system.

Although the steps are shown in FIG. 11 having a particular order, it is intended that the steps may be performed in any order. It is also intended that some of these steps may be optional. The method 1100 may be executed to improve the processing of image data collected from cameras mounted on autonomous vehicles by correcting incorrect classifications of the trajectory for detected objects.

At step 1110, the method 1100 can generate one or more tracking images for each of the tracking identifiers. At 1112, the method 1100 can generate each of the tracking images including one or more visual indications of the time stamps. At 1114, the method 1100 can generate based on the time stamps and the bounding boxes allocated to each of the tracking identifiers (e.g., forward trajectory 610 and/or lateral trajectory 620). The tracking identifiers can indicate the trajectory of an object over time based on the location and appearance (e.g., color or brightness) of the tracking images (e.g., bounding boxes) included in the tracking identifier. For example, a tracking identifier can indicate a lateral movement of an object over a long period of time based on a large number of tracking images (e.g., bounding boxes) with a large difference in the one or more visual indications (e.g., a large difference in the color or brightness) of the tracking images that are included in the tracking identifier. At 1116, the method 1100 can generate by the one or more processors.

At 1120, the method 1100 can train an artificial intelligence model to output an indication of a type of trajectory. At 1122, the method 1100 can train based on input including the tracking images having the visual indications. At 1124, the method 1100 can train by the one or more processors. For example, the method can include the trajectories corresponding to movement of the objects in a physical environment depicted in the sequence of images.

For example, the method can include determining, by the one or more processors via the trained artificial intelligence model, whether an input tracking image satisfies a similarity threshold indicating that a trajectory of the input tracking image corresponds to one or more of the trajectories of the objects. The similarity threshold can include a quantitative value that has been previously determined (e.g., a numerical value received by the one or more processors) to indicate a minimum degree of similarity necessary to qualify for grouping, or clustering, of two vectors. For example, the similarity threshold can include a numerical value, received by the one or more processors, that can be used to determine whether two similarity vectors satisfy a minimum degree of similarity, as specified by the similarity threshold, to be grouped (or clustered) together by the trained artificial intelligence model. For example, the method can include generating, by the one or more processors via the trained artificial intelligence model, the indication of the first type of trajectory to identify a second type of movement of the object, in response to a determination that the input tracking image does not satisfy the similarity threshold.

For example, the method can include generating, by the one or more processors via the trained artificial intelligence model, the indication of the first type of trajectory to identify a first type of movement of an object corresponding to the input tracking image, in response to a determination that the input tracking image satisfies the similarity threshold. The type of trajectory (e.g., a first type of trajectory) can be grouped as either a known-type of trajectory or an unknown, or unclassifiable, type of trajectory. Alternatively, in some examples, the type of trajectory can be grouped as either a known, or an unknown, type of trajectory and, if a known type of trajectory, can be further grouped into one or more different types of known trajectories (e.g., a forward trajectory, a lateral trajectory, etc.). For example, the method can include the first type of movement corresponding to a trajectory linked with a predetermined classification. For example, the method can include the second type of movement corresponding to a trajectory excluded from a predetermined classification.

For example, the computer readable medium can include one or more instructions executable by a processor to determine, via the trained artificial intelligence model, whether an input tracking image satisfies a similarity threshold indicating that a trajectory of the input tracking image corresponds to one or more of the trajectories of the objects. For example, the processor can generate, via the trained artificial intelligence model, the indication of the first type of trajectory to identify a first type of movement of an object corresponding to the input tracking image, in response to a determination that the input tracking image satisfies the similarity threshold. For example, the processor can generate, by the one or more processors via the trained artificial intelligence model, the indication of the first type of trajectory to identify a second type of movement of the object, in response to a determination that the input tracking image does not satisfy the similarity threshold.

Having now described some illustrative implementations, the foregoing is illustrative and not limiting, having been presented by way of example. In particular, although many of the examples presented herein involve specific combinations of method acts or system elements, those acts and those elements may be combined in other was to accomplish the same objectives. Acts, elements and features discussed in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both "A" and 'B'. Such references used in conjunction with "comprising" or other open terminology can include additional items. References to "is" or "are" may be construed as nonlimiting to the implementation or action referenced in connection with that term. The terms "is" or "are" or any tense or derivative thereof, are interchangeable and synonymous with "can be" as used herein, unless stated otherwise herein.

Directional indicators depicted herein are example directions to facilitate understanding of the examples discussed herein, and are not limited to the directional indicators depicted herein. Any directional indicator depicted herein can be modified to the reverse direction, or can be modified to include both the depicted direction and a direction reverse to the depicted direction, unless stated otherwise herein. While operations are depicted in the drawings in a particular order, such operations are not required to be performed in the particular order shown or in sequential order, and all illustrated operations are not required to be performed. Actions described herein can be performed in a different order. Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Scope of the systems and methods described herein is thus indicated by the appended claims, rather than the foregoing description. The scope of the claims includes equivalents to the meaning and scope of the appended claims.

What is claimed is:

1. A method, comprising:
   identifying, by one or more processors coupled to non-transitory memory, a plurality of bounding boxes for one or more objects depicted in each image of a sequence of images captured during operation of an autonomous vehicle;
   allocating, by the one or more processors and based on corresponding positions of the bounding boxes in each image and corresponding time stamps of the bounding boxes in the sequence, one or more of the bounding boxes to one or more tracking identifiers each indicating trajectories of corresponding ones of the objects;
   generating, by the one or more processors and based on the time stamps and the bounding boxes allocated to each of the tracking identifiers, one or more tracking images for each of the tracking identifiers including the allocated one or more bounding boxes, the allocated one or more bounding boxes included in each of the tracking images including one or more visual indications corresponding to the time stamps,
   wherein the one or more visual indications of the allocated one or more bounding boxes included in a first tracking image and associated with a first time stamp is distinct from the one or more visual indications of the allocated one or more bounding boxes included in a second tracking image and associated with a second time stamp, and
   wherein the one or more visual indications include at least one of color properties for the bounding boxes or line properties for the bounding boxes; and
   training, by the one or more processors and based on input including the tracking images having the visual indications, an artificial intelligence model to output an indication of a type of trajectory.

2. The method of claim 1, further comprising:
   determining, by the one or more processors via the trained artificial intelligence model, whether an input tracking image satisfies a similarity threshold indicating that a trajectory of the input tracking image corresponds to one or more of the trajectories of the objects.

3. The method of claim 2, further comprising:
   generating, by the one or more processors via the trained artificial intelligence model, the indication of the type of trajectory to identify a first type of movement of an object corresponding to the input tracking image, in response to a determination that the input tracking image satisfies the similarity threshold.

4. The method of claim 3, wherein the first type of movement corresponding to a trajectory linked with a predetermined classification.

5. The method of claim 3, further comprising:
generating, by the one or more processors via the trained artificial intelligence model, the indication of the type of trajectory to identify a second type of movement of the object, in response to a determination that the input tracking image does not satisfy the similarity threshold.

6. The method of claim 5, wherein the second type of movement corresponding to a trajectory excluded from a predetermined classification.

7. The method of claim 1, further comprising:
generating, by the one or more processors via a second artificial intelligence model, the plurality of bounding boxes.

8. The method of claim 1, wherein the trajectories corresponding to movement of the objects in a physical environment depicted in the sequence of images.

9. The method of claim 1, wherein the color properties for the bounding boxes includes at least one of:
a color of the one or more bounding boxes included in each of the tracking images,
a brightness of the one or more bounding boxes included in each of the tracking images,
a saturation of the one or more bounding boxes included in each of the tracking images, or
a color gradient of the one or more bounding boxes included in each of the tracking images, and
wherein the line properties for the bounding boxes includes at least one of:
an opacity of the one or more bounding boxes included in each of the tracking images, or
a line thickness of the one or more bounding boxes included in each of the tracking images.

10. A system, comprising:
one or more processors coupled to non-transitory memory, the one or more processors configured to:
identify a plurality of bounding boxes for one or more objects depicted in each image of a sequence of images captured during operation of an autonomous vehicle;
allocate, based on corresponding positions of the bounding boxes in each image and corresponding time stamps of the bounding boxes in the sequence, one or more of the bounding boxes to one or more tracking identifiers each indicating trajectories of corresponding ones of the objects;
generate, based on the time stamps and the bounding boxes allocated to each of the tracking identifiers, one or more tracking images for each of the tracking identifiers including the allocated one or more bounding boxes, the allocated one or more bounding boxes included in each of the tracking images including one or more visual indications of the time stamps,
wherein the one or more visual indications of the allocated one or more bounding boxes included in a first tracking image and associated with a first time stamp is distinct from the one or more visual indications of the allocated one or more bounding boxes included in a second tracking image and associated with a second time stamp, and
wherein the one or more visual indications include at least one of color properties for the bounding boxes or line properties for the bounding boxes; and
train, based on input including the tracking images having the visual indications, an artificial intelligence model to output an indication of a type of trajectory.

11. The system of claim 10, the processors further configured to:
determine, via the trained artificial intelligence model, whether an input tracking image satisfies a similarity threshold indicating that a trajectory of the input tracking image corresponds to one or more of the trajectories of the objects.

12. The system of claim 11, the processors further configured to:
generate, via the trained artificial intelligence model, the indication of the type of trajectory to identify a first type of movement of an object corresponding to the input tracking image, in response to a determination that the input tracking image satisfies the similarity threshold.

13. The system of claim 12, wherein the first type of movement corresponding to a trajectory linked with a predetermined classification.

14. The system of claim 12, the processors further configured to:
generating, by the one or more processors via the trained artificial intelligence model, the indication of the type of trajectory to identify a second type of movement of the object, in response to a determination that the input tracking image does not satisfy the similarity threshold.

15. The system of claim 14, wherein the second type of movement corresponding to a trajectory excluded from a predetermined classification.

16. The system of claim 10, the processors further configured to:
generating, by the one or more processors via a second artificial intelligence model, the plurality of bounding boxes.

17. A non-transitory computer readable medium including one or more instructions stored thereon and executable by a processor to:
identify, by a processor, a plurality of bounding boxes for one or more objects depicted in each image of a sequence of images captured during operation of an autonomous vehicle;
allocate, by the processor and based on corresponding positions of the bounding boxes in each image and corresponding time stamps of the bounding boxes in the sequence, one or more of the bounding boxes to one or more tracking identifiers each indicating trajectories of corresponding ones of the objects;
generate, by the processor and based on the time stamps and the bounding boxes allocated to each of the tracking identifiers, one or more tracking images for each of the tracking identifiers including the allocated one or more bounding boxes, the allocated one or more bounding boxes included in each of the tracking images including one or more visual indications of the time stamps,
wherein the one or more visual indications of the allocated one or more bounding boxes included in a first tracking image and associated with a first time stamp is distinct from the one or more visual indications of the allocated one or more bounding boxes included in a second tracking image and associated with a second time stamp, and wherein the one or more visual indications include at least one of color properties for the bounding boxes or line properties for the bounding boxes; and train, by the processor and based on input including the tracking images having the visual indications, an artificial intelligence model to output an indication of a type of trajectory.

18. The non-transitory computer readable medium of claim 17, wherein the computer readable medium further includes one or more instructions executable by the processor to:

determine, by the processor via the trained artificial intelligence model, whether an input tracking image satisfies a similarity threshold indicating that a trajectory of the input tracking image corresponds to one or more of the trajectories of the objects.

19. The non-transitory computer readable medium of claim 18, wherein the computer readable medium further includes one or more instructions executable by the processor to:

generate, by the processor via the trained artificial intelligence model, the indication of the type of trajectory to identify a first type of movement of an object corresponding to the input tracking image, in response to a determination that the input tracking image satisfies the similarity threshold.

20. The non-transitory computer readable medium of claim 19, wherein the computer readable medium further includes one or more instructions executable by the processor to:

generate, by the one or more processors via the trained artificial intelligence model, the indication of the type of trajectory to identify a second type of movement of the object, in response to a determination that the input tracking image does not satisfy the similarity threshold.

* * * * *